US011425531B2

(12) United States Patent
Tadayon et al.

(10) Patent No.: US 11,425,531 B2
(45) Date of Patent: Aug. 23, 2022

(54) CONNECTIVITY-BASED POSITIONING DETERMINATION IN WIRELESS COMMUNICATION NETWORKS

(71) Applicants: Navid Tadayon, Kanata (CA); Mohammadhadi Baligh, Ottawa (CA)

(72) Inventors: Navid Tadayon, Kanata (CA); Mohammadhadi Baligh, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 194 days.

(21) Appl. No.: 16/675,597

(22) Filed: Nov. 6, 2019

(65) Prior Publication Data
US 2021/0136527 A1 May 6, 2021

(51) Int. Cl.
*H04W 4/029* (2018.01)
*H04W 76/20* (2018.01)
*H04L 5/00* (2006.01)

(52) U.S. Cl.
CPC ........... *H04W 4/029* (2018.02); *H04L 5/0048* (2013.01); *H04W 76/20* (2018.02)

(58) Field of Classification Search
CPC .... H04L 1/1607; H04L 1/16; H04W 28/0231; H04W 4/021; H04W 28/0226; H04W 28/02; H04B 17/318
See application file for complete search history.

(56) References Cited

U.S. PATENT DOCUMENTS

2018/0098299 A1 4/2018 Chae
2020/0100048 A1* 3/2020 Wu .................... H04W 4/02

FOREIGN PATENT DOCUMENTS

| CN | 107852582 A |   | 3/2018  |              |
|----|-------------|---|---------|--------------|
| CN | 109196925 A |   | 1/2019  |              |
| CN | 111866719 A | * | 10/2020 | ... H04B 17/318 |

OTHER PUBLICATIONS

J. Borras, P. Hatrack and N. Mandayam, "Decision Theoretic Framework for NLOS Identification," IEEE VTC 1998, May 1998, pp. 1583-1587.
C. Wu, Z. Yang, Z. Zhou, K. Qian, Y. Liu and M. Liu, "PhaseU: Real-time LOS Identification with WiFi," 2015 IEEE Conference on Computer Communications (INFOCOM), Kowloon, 2015, pp. 2038-2046.

(Continued)

*Primary Examiner* — Joshua L Schwartz

(57) ABSTRACT

At a first User Equipment (UE) in a wireless communication network, signaling that is associated with a direct wireless communication link between the first UE and a second UE is received. Signaling indicative of an estimate of range between the first UE and the second UE, based on the received signaling, is transmitted to network equipment in the wireless communication network. According to another aspect of the present disclosure, signaling that is indicative of an estimate of range associated with such a direct wireless communication link is received, and signaling indicative of a prediction model and/or signaling indicative of a prediction from the prediction model is transmitted. The prediction model is for prediction of Line of Sight (LoS) status of communication links in the wireless communication network, and is based in part on the estimate of range.

17 Claims, 12 Drawing Sheets

(56) References Cited

OTHER PUBLICATIONS

I. Guvenc, C. Chong, F. Watanabe and H. Inamura, "NLOS Identification and Weighted Least-Squares Localization for UWB Systems Using Multipath Channel Statistics," EURASIP Journal on Advances in Signal Processing, vol. 2008, 2008, pp. 1-14.
H. Wymeersch, S. Marano, W. Gifford and M. Win, "Machine Learning Approach to Ranging Error Mitigation for UWB Localization," IEEE Transactions on Communications, vol. 60, No. 6, 2012, pp. 1719-1728.
S. Marano, W. M. Gifford, H. Wymeersch and M. Win, "NLOS Identification and Mitigation for Localization Based on UWB Experimental Data," IEEE Journal on Selected Areas in Communications, vol. 28, No. 7, 2010, pp. 1026-1035.
I. Guvenc, C. Chong, and F. Watanabe, "NLOS Identification and Mitigation for UWB Localization Systems," 2007 IEEE Wireless Communications and Networking Conference, Kowloon, China, Mar. 11-15, 2007, pp. 1573-1578.
MediaTek Inc.,"Reference signal design for NR positioning",3GPP TSG-RAN WG1 #96bis Meeting R1-1904500,Xian, China, Apr. 8 to Apr. 12, 2019,Total 24 Pages.
Intel Corporation,"Architecture and Signaling/procedure on support of NR dependent positioning methods",3GPP TSG RAN WG2 Meeting #106 R2-1906360,Reno, USA, May 13 to 17, 2019,Total 5 Pages.

\* cited by examiner

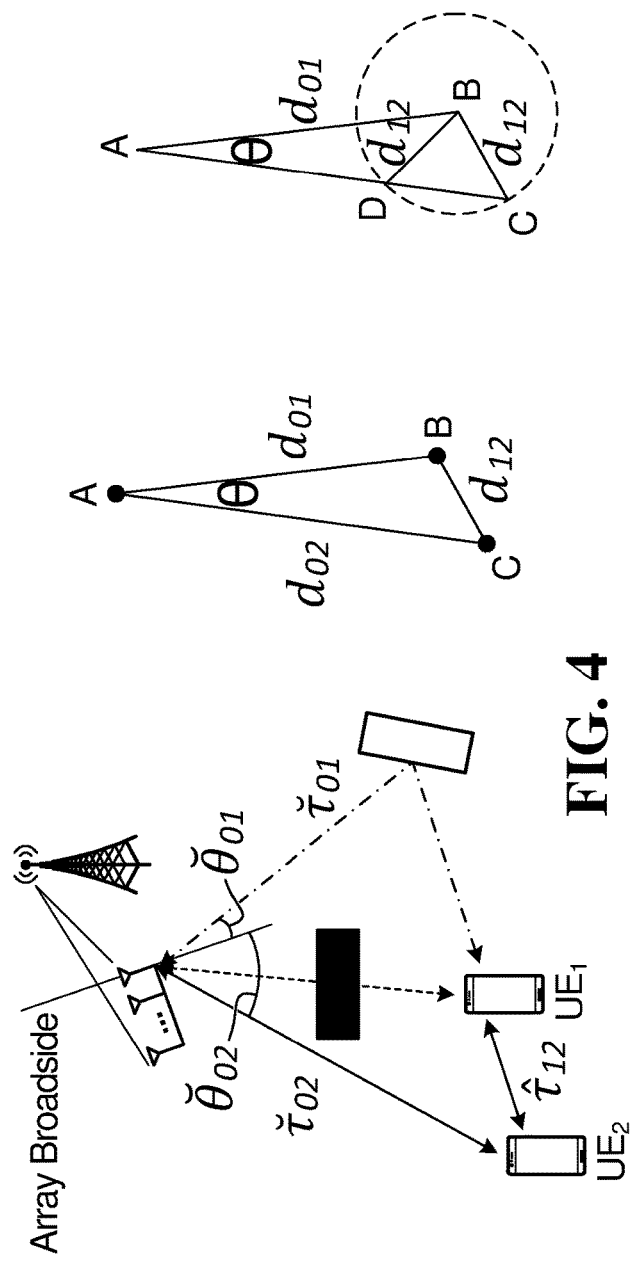
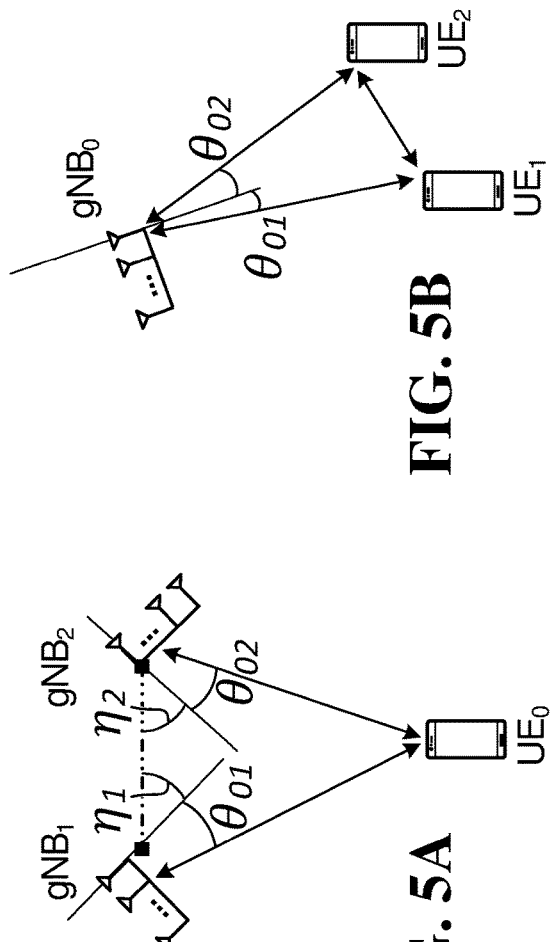
FIG. 4
FIG. 5A
FIG. 5B

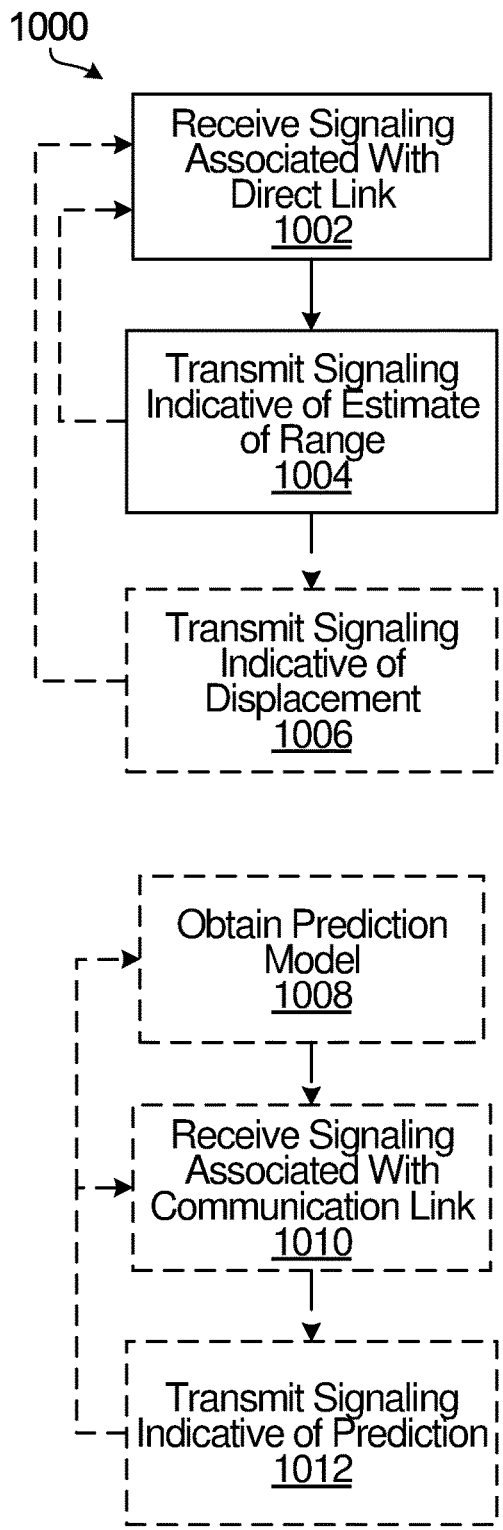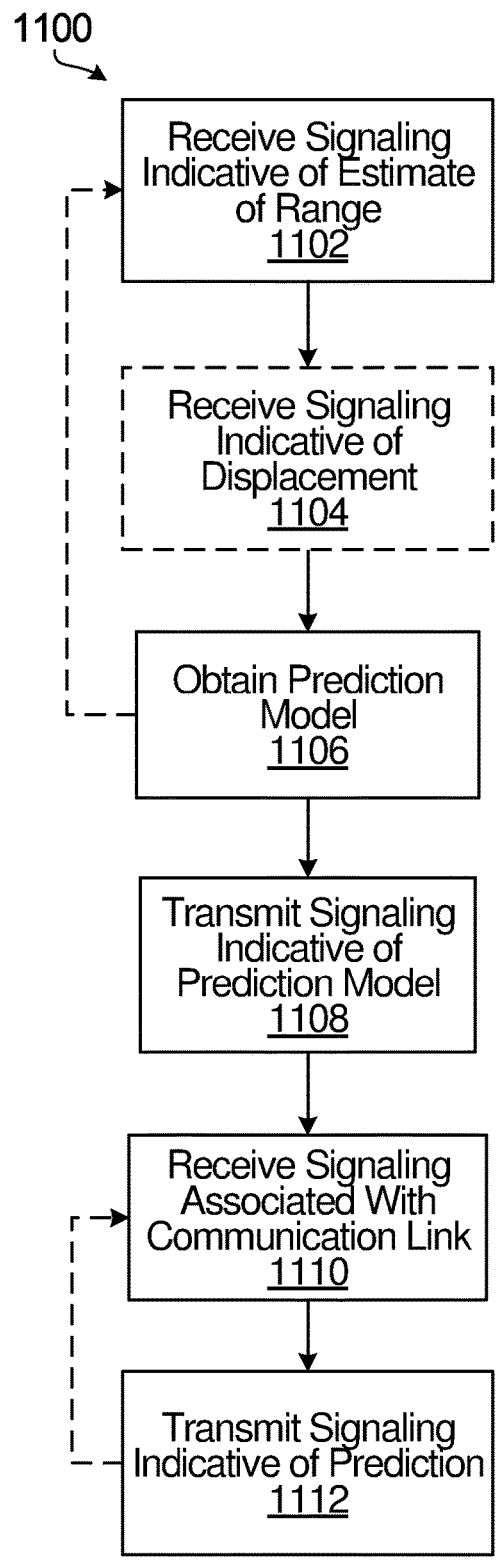
FIG. 10
FIG. 11

CONNECTIVITY-BASED POSITIONING DETERMINATION IN WIRELESS COMMUNICATION NETWORKS

FIELD

This application relates to wireless communications, and in particular to positioning determination in wireless communication networks.

BACKGROUND

Lack of Line of Sight (LoS) communications, also referred to as Non Line of Sight (NLoS), impacts the accuracy of estimating the position or location of a UE in a wireless communication network. This phenomenon occurs because NLoS creates bias in the estimation of direct-path parameters such as Time of Flight (ToF), also referred to as range, and Angle of Arrival (AoA), which are two sources of information that are crucial for geometric-based positioning determination. In particular, prior information of NLoS range biases $l_j(t)$ to all Base Stations (BSs) is needed to be able to form a well-conditioned range-based User Equipment (UE) positioning problem that has a unique and unbiased solution. By definition, $l_j(t)$ represents the extra time it takes for a wave to travel between a $j^{th}$ BS and a UE over the "strongest" indirect path relative to a direct path. The NLoS bias term $l_j(t)$ is a function of locations and electrical properties of any diffusers and reflectors that are distributed in an overlapping field of views of transmitter and receiver antennas.

It should be noted that NLoS is not equivalent to multipath. A signal might undergo multipath, yet the power of a ray propagating along a direct path is stronger than indirect rays reaching a receiver through reflections. In an NLoS scenario that is problematic for UE positioning determination, a direct LoS ray between a BS and a UE is weaker than one or more indirect rays, and therefore a receiver has no way of distinguishing the LoS ray from the NLoS ray(s).

Positioning with range estimations that are biased results in location estimates can be off by tens of meters. This makes NLoS one of the most significant sources of positioning error in wireless communication networks, which typically operate in cluttered environments with NLoS caused by physical blockages of direct paths between transmitters and receivers. Although the NLoS positioning problem can be more contained in certain types of networks, such as $5^{th}$ Generation New Radio (5G NR) networks with a positioning subsystem and involvement of more BSs in the positioning process for a single UE, NLoS communications can still create challenges in terms of UE positioning determination.

Efforts in addressing the issue of NLoS include LoS identification and LoS mitigation. LoS identification algorithms attempt to identify whether a link is a LoS link or an NLoS link. Links that are identified as NLoS are eliminated from position determination, which uses only LoS links. LoS mitigation approaches attempt to estimate how much NLoS error was added to each link and subtract this error from raw estimations of range, so that all links become usable (less biased). Challenges with these approaches include effectively distinguishing between LoS and NLoS links for LoS identification, and accurately determining NLoS error for each link in LoS mitigation.

A LoS identification approach that leverages communication network infrastructure and supports positioning determination based on LoS links and eliminating NLoS links from positioning determination is desirable.

SUMMARY

Aspects of the present disclosure relate to distinguishing between LoS links and NLoS links, based at least in part on closed loops of connectivity between nodes in a communication network in some embodiments. Although disclosed embodiments include learning-based implementations, other embodiments are also possible.

According to one aspect of this disclosure, a method in a wireless communication network involves receiving, by a first UE, signaling that is associated with a direct wireless communication link between the first UE and a second UE, and transmitting, by the first UE, to network equipment in the wireless communication network, signaling indicative of an estimate of range between the first UE and the second UE. The estimate of range is based on the received signaling.

A first UE for a wireless communication network, according to another aspect, includes a receiver, a transmitter, a processor coupled to the receiver and to the transmitter, and a processor-readable memory, coupled to the processor, storing processor-executable instructions which, when executed by the processor, cause the processor to perform a method. The method involves receiving signaling that is associated with a direct wireless communication link between the first UE and a second UE, and transmitting, to network equipment in the wireless communication network, signaling indicative of an estimate of range between the first UE and the second UE, the estimate of range being based on the received signaling.

Another aspect relates to a processor-readable memory storing processor-executable instructions which, when executed by a processor in a first UE in a wireless communication network, cause the processor to perform such a method.

A method in a wireless communication network, according to a further aspect, involves receiving, by network equipment, signaling that is indicative of an estimate of range associated with a direct wireless communication link between a first UE and a second UE in the wireless communication network, and transmitting signaling by the network equipment. The transmitting involves transmitting one or more of: signaling indicative of a prediction model for prediction of LoS status of communication links in the wireless communication network, and signaling indicative of a prediction from the prediction model of LoS status of one or more communication links in the wireless communication network. The prediction model is based in part on the estimate of range between the first UE and the second UE.

Network equipment for a wireless communication network, in accordance with yet another aspect of the present disclosure, includes a transmitter, a receiver, a processor coupled to the transmitter and to the receiver, and a processor-readable memory, coupled to the processor, and storing processor-executable instructions which, when executed by the processor, cause the processor to perform a method. The method, as described above, involves: receiving signaling that is indicative of an estimate of range associated with a direct wireless communication link between a first UE and a second UE in the wireless communication network; and transmitting one or more of: signaling indicative of a prediction model for prediction of LoS status of communication links in the wireless communication network, and signaling indicative of a prediction from the prediction model of LoS status of one or more communication links in the wireless communication network, the prediction model being based in part on the estimate of range between the first UE and the second UE.

Another aspect relates to a processor-readable memory storing processor-executable instructions which, when executed by a processor in network equipment in a wireless communication network, cause the processor to perform such a method.

BRIEF DESCRIPTION OF THE DRAWINGS

Embodiments of the disclosure will now be described with reference to the attached drawings in which:

FIG. 4 includes block diagrams illustrating estimation of range and angle between a BS and two UEs;

FIGS. 5A and 5B include block diagrams illustrating two different types of triangular connectivity paths that may be found in a connectivity graph;

FIG. 10 is a flow chart illustrating an example of a method performed by a UE in an embodiment;

FIG. 11 is a flow chart illustrating an example of a method performed by network equipment in an embodiment;

DETAILED DESCRIPTION

Figure 1:
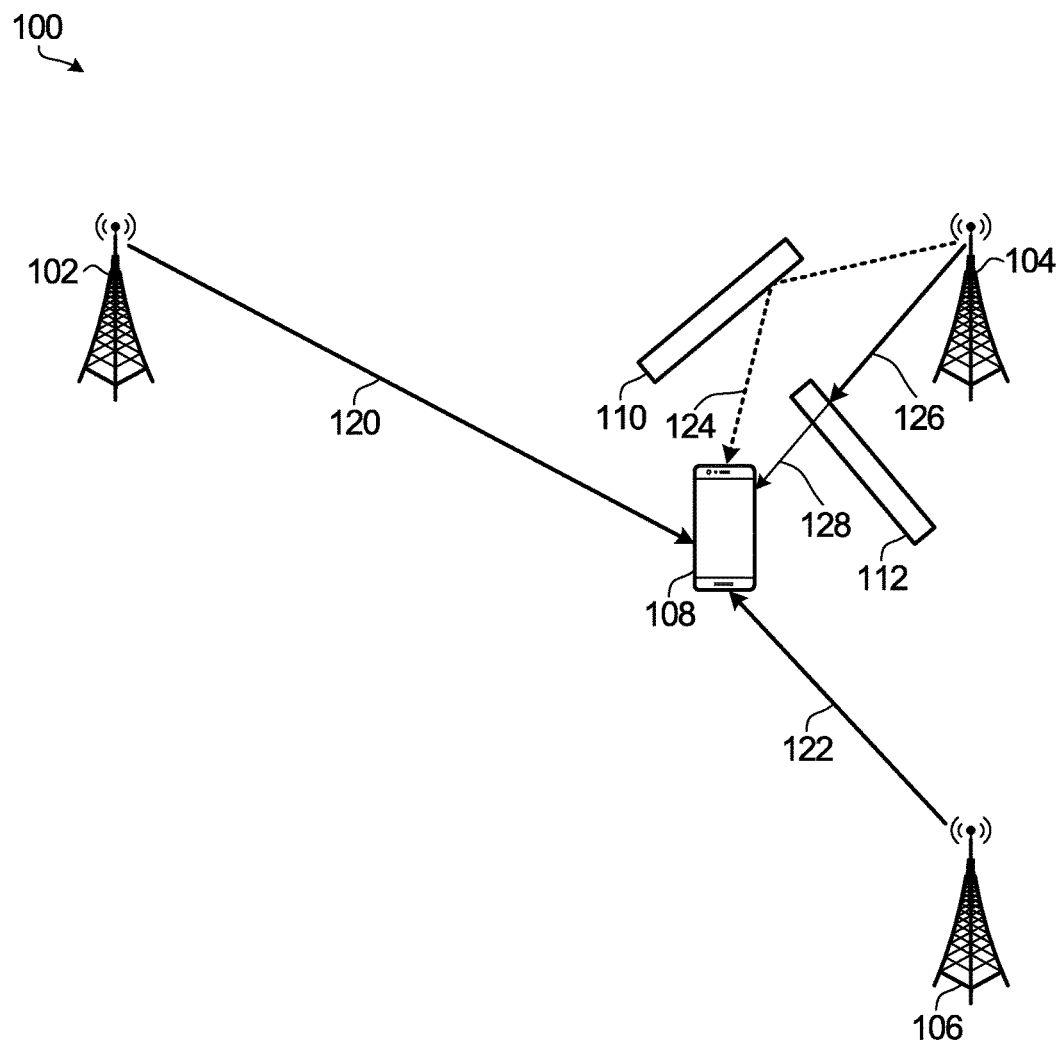
FIG. 1 is a block diagram illustrating a wireless communication network and an NLoS scenario.

FIG. 1 is a block diagram illustrating a wireless communication network and an NLoS scenario for UE positioning determination. In the example shown, the wireless communication network 100 includes BSs 102, 104, 106 and a UE 108, and the operating environment of the UE 108 includes two obstacles 110, 112. LoS paths are shown at 120, 122, and an NLoS path is shown at 124. A further LoS path 126 between the UE 108 and the BS 104 is blocked by the obstacle 112, and therefore a "weak" LoS path is shown at 128. In this scenario, a ray propagating along NLoS path 124 may be stronger than the ray propagating along the weak LoS path 128 and therefore it is not possible to distinguish these LoS and NLoS rays from each other at the UE 108 based only on received signal power.

Although geometric-based approaches to UE positioning determination may be simple and cost-effective, such approaches tend to work well in a LoS scenario and when certain assumptions on signal, noise, channel, and array models are satisfied. However, NLoS scenarios are more common and realistic in wireless communication networks.

As noted above, efforts on addressing the issue of NLoS include LoS identification and LoS mitigation. There may be a limited number of BSs that can communicate with a UE at any time, and therefore LoS identification might leave too few BSs as positioning anchors to localize UE position. For example, in order to localize a UE in three dimensional (3D) space using triangulation, at least four BSs are needed. This can be a problem especially in cellular systems for urban areas where the probability of NLoS is normally higher than the probability for LoS. Although NLoS error subtraction according to LoS mitigation may make all links usable for positioning determination, LoS mitigation is a much harder problem to tackle than LoS identification.

Given the complexity of the LoS mitigation problem, LoS identification may still be an attractive option for positioning determination. Although techniques based on using only LoS links for positioning determination are often referred to as LoS identification techniques, it should be noted that LoS identification according to embodiments disclosed herein may involve identifying LoS links, identifying NLoS links, and/or otherwise distinguishing LoS links and NLoS links from each other. Regardless of the type(s) of links that are actually identified, determining which links are NLoS links and removing them from positioning determination is an important step in improving the accuracy of positioning or localization systems based on LoS identification. For example, if no prior positioning or localization statistics about NLoS links are known, then a positioning algorithm is one that determines which links are NLoS links and eliminates them from the positioning determination process. This is because the Cramer-Rao Lower Bound (CRLB) does not depend on NLoS links.

On the cusp of transformation to 5G, sidelink (SL) communications is becoming a fundamental driver of change, in particular with rising interest in such applications as UE cooperation and vehicle-to-everything (V2X) communications, for example. SL communications refers to the ability of close-by UEs to communicate or cooperate with each other directly, rather than through network communications. An SL is therefore an example of a direct wireless communication link between UEs. Such exploitation of spatial diversity beyond what is possible through multiple input multiple output (MIMO), for example, is expected to have enormous potential and enhance communication network capacity.

SL communications is also potentially beneficial for positioning, and may be useful in addressing some of the long-standing challenges facing the field of positioning, such as accurate and reliable NLoS elimination, anchor insufficiency, etc. For example, shadowing is the main phenomenon that causes NLoS, but decorrelates within the order of meters. With reference to FIG. 1, for example, another UE that is located just a few meters from the UE 108, such as toward the BS 102 or the BS 106, could be unaffected by shadowing from the obstacle 112 and be in LoS communications with each of the BSs 102, 104, 106.

As such, shadowing can potentially be detected if UEs can be become "positioning proxies" for each other. Perhaps even more important is the fact that the probability of LoS in SL communications is expected to be higher than in uplink (UL) or downlink (DL) communications, because UE cooperation through SL communications is expected to be allowed only within limited geographical areas to conserve UE power and keep SL interference patterns in a communication network under control.

Some embodiments disclosed herein relate to building or training a model that predicts the presence of NLoS links using Machine Learning (ML), and illustratively Neural Networks (NNs). UL, DL, and SL communications and measurements are used in some embodiments in collecting data for building or training such a model. The present disclosure encompasses embodiments in which existing communication network infrastructure, rather than an expensive and non-autonomous expert system, is exploited to generate training datasets at a much larger scale and possibly in an uninterrupted manner instead of relying on availability of potentially less noisy but much smaller datasets obtainable from expert systems.

Distinguishing between LoS links and NLoS links may be done through a hypothesis testing framework. This involves forming a likelihood ratio $\Lambda(x)$ of a statistic x of the received signal and deciding in favor of one of the two hypothesis $\mathcal{H}_0$ (LoS) and $\mathcal{H}_1$ (NLoS):

$$\mathcal{H}_0: x \sim \mathcal{P}_x^{LoS}(x), \mathcal{H}_1: x \sim \mathcal{P}_x^{NLoS}(x) \quad (1\text{-}1)$$

$$\Lambda(x) = \frac{\mathcal{P}_x^{LoS}(x)}{\mathcal{P}_x^{NLoS}(x)} \gtrless_{\mathcal{H}_1}^{\mathcal{H}_0} \gamma$$

where $\mathcal{P}_x^{LoS}$ and $\mathcal{P}_x^{NLoS}$ are the probability distribution functions (PDFs) or likelihoods of LoS and NLoS, respectively. If distributions of x under LoS and NLoS are sufficiently distinct, then the above likelihood ratio test (LRT) can help make a LoS/NLoS decision. Establishing this ratio requires knowledge of the PDFs and threshold $\gamma$, which depends on extensive prior knowledge that is typically collected through offline surveying. Ideally, $\gamma = \mathcal{P}(\mathcal{H}_1)/\mathcal{P}(\mathcal{H}_0)$, where $\mathcal{P}(\mathcal{H}_r)$ is the ground-truth probability that $\mathcal{H}_r$ happens. However, this is not known exactly, and therefore experimentation is used to find a best estimate. In an environment where LoS/NLoS happen with the same frequency, $\gamma=1$.

In order to obtain labelled data for ML training, expert systems in an ultra-wideband (UWB) radio system or a high-resolution imaging system are to be used. However, one issue with such approaches for labelled data collection, which is also referred to as fingerprinting, is that these types of systems are expensive to operate. Generated labelled data are also not completely error-free. In addition, there is a potential scalability issue, especially in the context of using an expert system in wireless networks where the environment undergoes frequent changes that necessitate intermittent collection of training data from the new environment in order to pursue retraining. Just one labelled data set for an area of 100 m by 100 m with 1 m by 1 m resolution, for example, requires collection of 10,000 distinct fingerprints. Clearly this presents a scalability challenge for higher resolutions, larger areas, and/or retraining in expert system-based implementations.

When environment changes are ignored and an ML or Artificial Intelligence (AI) model is trained on a stale data set and utilized to predict NLoS bias at a location whose channel conditions have changed, significant prediction error can be introduced. This issue is known as concept/feature drift, and the resultant prediction error can manifest itself in the form of false alarms or misdetection, for example.

One possible approach to help mitigate or remedy drift and associated prediction error would be to morph or integrate an exploration subsystem, which is involved in label collection and training, into an exploitation subsystem, which utilizes a trained model. For example, one such approach may rely on "crowdsourcing" abilities of communication networks to collect a large amount of data during normal communications. This in effect leverages the distributed and mobile nature of UEs in order to collect large datasets for training. Existing infrastructure, rather than expensive and non-autonomous expert systems, can then be used to generate data for training but at a much larger scale and in an uninterrupted manner instead of relying on availability of smaller amounts of labelled data from expert systems.

Overall, existing ML solutions for LoS identification suffer from several shortcomings, including reliance on the availability of an expert system, high associated cost, being labor-intensive, and not being robust to feature and concept drift as the wireless communication environment is constantly changing.

The present disclosure relates in part to a model for predicting the presence of LoS/NLoS links based on range estimates that were collected or otherwise determined from UL, DL, and SL communications, in a cost-effective and adaptive manner. Other information, such as angle estimations based on UL communications, may also be used in building or training such a model.

In some embodiments, training data for developing a model includes a collection of tuples $\{(x,w)_l\}_l$, where x is a feature of lth link that is spatially unique but can be replicated temporally, and w indicates whether the lth link is NLoS, LoS, or unknown. For example, in one embodiment, $w \in \{-1,0,1\}$ indicates whether the link is NLoS (w=1), LoS (w=−1), or its status is unknown or indecisive (w=0).

Current approaches for collecting labels or training data are exhaustive processes as discussed above. An expert system is needed to survey the environment by collecting data x from each BS, and to then determine whether the link that is observed to that BS is or is not an NLoS link so that labels w can be generated and (x,w) can be formed before moving to a new location to repeat this process. Obtaining labels that are free from error is a laborious and costly task. When a link is obstructed, inspection based on received signal power is not in itself a reliable indication for the presence or absence of LoS. Instead, a specialized system such as a UWB system with high resolvability that has a multi-GHz sampling rate is needed to be able to detect whether there is a direct-path component of a signal that has a stronger indirect-path component. Even an expert system that is often used for training data collection introduces some error into the labeling process, due to such conditions as lack of synchronization, blockage, etc. Completely pure labels cannot be achieved in practice through streamlined processes.

In accordance with teachings in the present disclosure, labels for building or training a model are generated using the same devices that communicate in network, such as UEs and BSs. A dataset may be continuously updated without requiring an offline exploration or surveying stage, to collect data for training or otherwise building a model, that is separate from a prediction or exploitation stage to use the model for prediction.

In a communication network that supports UL, DL, and SL communications, reference signals (RSs) that are normally used for establishing and/or maintaining communication links can also be used to estimate ranges between network elements. See FIG. 2, which is a block diagram illustrating another example wireless communication network.

Figure 2:
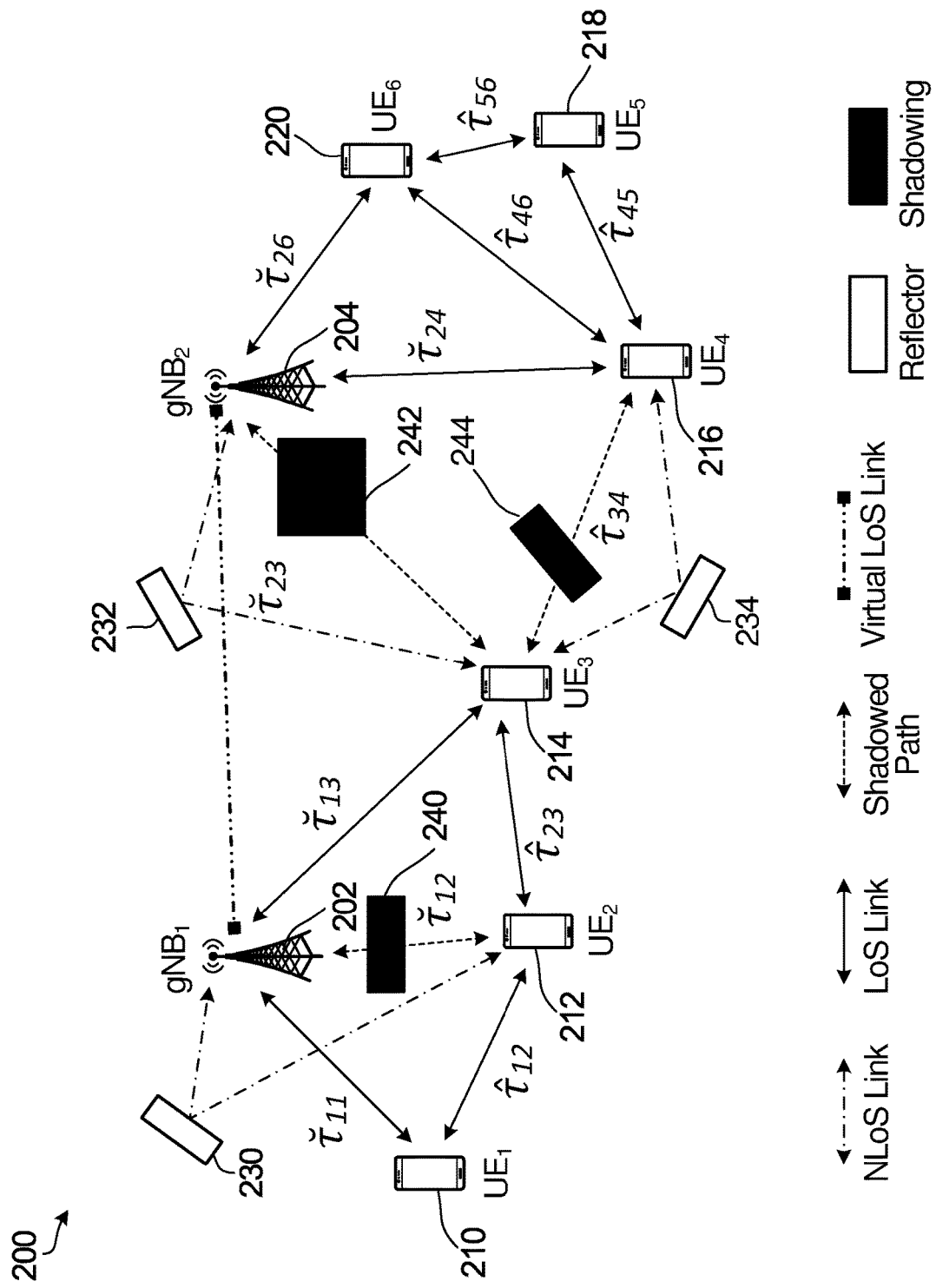
FIG. 2 is a block diagram illustrating another example wireless communication network.

The example wireless communication network 200 includes BSs 202, 204, each shown by way of example as a gNodeB (gNB), and UEs 210, 212, 214, 216, 218, 220. The operating environment of the UEs includes obstacles in the form of reflectors 230, 232, 234 and shadowing obstacles 240, 242, 244. Unobstructed LoS links are shown as solid lines, and different dashed line types are used in FIG. 2 to illustrate NLoS links and LoS links that are affected by shadowing. The path between the BSs 202, 204, which are labelled as $gNB_1$ and $gNB_2$ in FIG. 2, is shown as a solid line, but may be considered a special type of LoS link in the context of range estimation because BS locations are expected to be known and fixed in many embodiments, and inter-BS range is either known or can be readily determined. This type of LoS link is also referred to herein as a virtual LoS link.

Communications may take place over any or all of the links shown in FIG. 2, and those communications are exploited in some embodiments to establish a connectivity graph. A connectivity graph includes edges that represent links between communication network nodes such as UEs and BSs, and also includes respective range estimates that are obtained for those links or edges. For example, the UL/DL range estimates $\check{\tau}$ and the SL ranges estimates $\check{\tau}$ shown in FIG. 2 may be transmitted to network equipment, such as one of the gNBs or a separate positioning server, for further processing. A full-connectivity graph is also referred to herein as G=(V, E).

With $\mathcal{N}$ denoting the set of all nodes (UEs and BSs) in the network, and $\mathcal{H}^v \subset \mathcal{H}$ denoting the set of nodes that (i) are connected to a UE v and (ii) were subject to range measurements with v, the connectivity graph G is defined by vertex set V and edge set E as given by $$V = \mathcal{N}$$

$$E = \{(v,v'): v, v' \in V \land (v \in \mathcal{H}^{v'} \lor v' \in \mathcal{N}^v)\} \quad (1\text{-}2)$$

In order to establish G at network equipment, each UE relays signaling that is indicative of the following set to that network equipment in some embodiments $$T_v^{SL} = \{(x_{v,v'}, \check{\tau}_{v,v'}, id_{v'}) Lv' \in \mathcal{N}_{UE}^v\}, v \in V \quad (1\text{-}3)$$

where $\mathcal{N}_{UE}^v \subset \mathcal{N}^v$ is the set of UEs that (i) are connected with UE v and (ii) were subject to range estimates to UE v, $\check{v}_{v,v'}$ is the SL range estimate between UEs v and v', and $x_{v,v'}$ is a processed version of SL channel data, also referred to herein as a channel tensor, that is obtained by transforming raw channel data $h_{v,v'}$ into a form that is free from or at least has reduced spurious fluctuations that inhibit learning, such as random synchronization errors and small scale phase (SSP) for example. A cross-covariance tensor is one example of $x_{v,v'}$.

Similarly, with $\mathcal{N}_{BS}^v \subset \mathcal{H}^v$ denoting the set of BSs that (i) are connected with UE v and (ii) were subject to DL range measurements with UE v, in some embodiments signaling that is indicative of the following is also relayed by the UE to network equipment that is to establish the connectivity graph $$T_v^{DL} = \{(x_{v,v'}, \check{\tau}_{v,v'}): v' \in \mathcal{N}_{BS}^v\}, v \in V \quad (1\text{-}4)$$

where $\check{\tau}_{v,v'}$ is the DL range estimate between BS v' and UE v and $x_{v,v'}$ is a channel tensor as described above.

A full connectivity graph may also take into account $T_v^{UL}$, the information set inferred by each BS as a result of UL ranging. Each BS, like each UE, may transmit signaling that is indicative of this set to a network component that generates the connectivity graph, if the connectivity graph is not generated by the BS itself.

Given sets $T_v^{SL}, T_v^{DL}, T_v^{UL}, \forall v \in V$, a full-connectivity graph can be established and NLoS/LoS labels for the tensors $x_{v,v'}$ can be generated as disclosed by way of example in further detail elsewhere herein. These labels and tensors are subsequently used in training, which is also disclosed herein by way of example.

When there is no range estimate on a particular SL/UL/DL or the range estimate for a link is stale, in some embodiments the corresponding edge in the connectivity graph is removed or updated with a new range estimate. Range estimate expiration relates to environment changes, due to UE mobility for example, as a result of which distances between UEs and other elements in a communication network vary in time. Without any blockage or shadowing in a communication network, all links are LoS links. In this case, any closed connectivity path, such as a "triangle" or more generally a loop, "cycle", or "circle" r, denoted by $Cir_r = (V_r, E_r)$, in the full-connectivity graph has the property that $$\tau_{v,v'} < \sum_{(a,b) \in E_R \setminus (v,v')} \tau_{a,b}, \forall (v, v') \in E_r \quad (1\text{-}5)$$

where $\tau$ is the general notation for true range in UL/DL/SL and $V_r$, $E_r$ are the vertices and edges of rth sub-graph circle $Cir_r$ on the full-connectivity graph. In the present disclosure, closed connectivity paths are referred to generally as "circles" simply for ease of reference. It should be appreciated, however, that a closed connectivity path or loop is not necessarily circular in shape, and may instead be triangular or more generally polygonal.

Figure 3D:
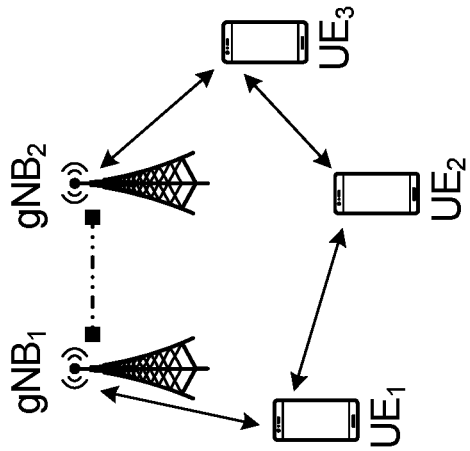
FIGS. 3A, 3B, 3C, and 3D include block diagrams illustrating examples of connectivity circles.
Figure 3C:
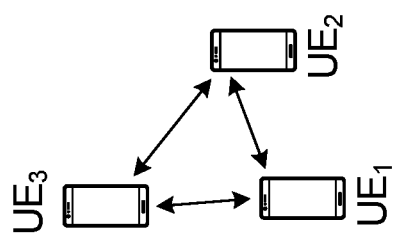
Figure 3B:
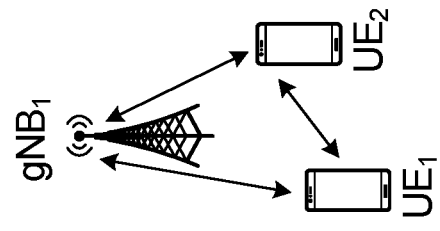
Figure 3A:
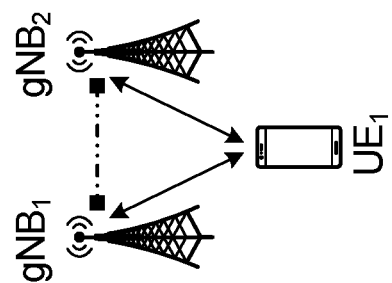

FIGS. 3A, 3B, 3C, and 3D include block diagrams illustrating examples of connectivity circles. The examples in FIGS. 3B and 3D are applicable to the UE positions as shown in FIG. 2, and the examples in FIGS. 3A and 3C relate to different UE positions than those shown in FIG. 2. Other connectivity circles are present in example shown in FIG. 2, and it should also be noted that others may dynamically appear and disappear as UEs move.

In general terms, (1-5) specifies that the range for any edge in a closed connectivity path should be smaller than the sum of ranges for the other edges in that same closed connectivity path. In the simple case that $|E_r|_0 = 3$, (1-5) is the triangle inequality. In reality, some links may be NLoS links as shown in FIG. 2, which causes $\tau \neq \check{\tau}$ and $\tau \neq \check{\tau}$ because $\check{\tau}_{v,v'} = \tau_{v,v'} + \ell_{v,v'}$, and $\ell_{v,v'} > 0$. Therefore, (1-5) might not be satisfied for circles that include one or more range estimates $\check{\tau}$ and/or $\check{\tau}$. When (1-5) is not satisfied for any range estimate $\check{\tau}_{v,v'}$ associated with a closed connectivity path, it can confidently be asserted that $\check{\tau}_{v,v'}$ is a range estimate obtained on an NLoS link. If (1-5) is satisfied, however, then no definitive conclusion can be made regarding LoS/NLoS status of the link for which $\check{\tau}_{v,v'}$ was obtained. A violation of (1-5) for a connectivity circle having three or more edges is definitive of an NLoS link, but a link for which (1-5) is satisfied could be a LoS link or an NLoS link.

To potentially improve the chance of detecting NLoS, an exhaustive search through a full-connectivity graph G may be performed, to find a minimum distance circle between every two nodes v, v'

$$(r_{v,v'}^*, d_{v,v'}^*) = \min_s \left( \mathcal{S} = \sum_{(a,b) \in E_r \setminus (v,v')} \tau_{a,b}: r \in \mathcal{N}_{circ} \right) \quad (1\text{-}6)$$

where $\mathcal{N}_{circ}$ is the set of circles in the graph and $r_{v,v'}^{\prime *}$ is an index of a circle that achieves the minimum sum delay $d_e^*$ based on ranges or range estimates associated with the edges that form a circle including v,v'. (1-6) in effect represents searching through the connectivity graph to find all the circles that connect every two nodes, obtaining the sum of delays on each circle, and finding the minimum sum of delays over all those circles. The following criterion can then be evaluated $$\hat{\tau}_{v,v'} \underset{\mathcal{H}_{0,1}}{\overset{\mathcal{H}_1}{\gtreqless}} d_{v,v'}^* \tag{1-7}$$

This criterion is based on an expectation that any link having a range estimate that is greater than the entire delay of the minimum distance circle is likely an NLoS path. An equality condition, in which $\tilde{\tau}_{v,v'}=d_{v,v'}^*$ may be treated in the same manner as a range estimate that is above the threshold or in the same manner as a range estimate that is below the threshold. For example, the equality condition may be treated in the same manner as a range estimate that is above the threshold to potentially increase the number of training samples for which a definitive label can be generated. In other embodiments, because the equality condition is less definitive of an NLoS condition than an inequality $\tilde{\tau}_{v,v'} > d_{v,v'}^*$ in (1-7), it may be preferable to treat the equality condition in the same manner as a range estimate that is below the threshold to decrease the probability of misdetection of NLoS.

Equations (1-6) and (1-7) are checked $\forall (v,v') \in E$. Note that (1-6) excludes inter-BS edges due to the way E was defined above. Inter-BS links need not necessarily be excluded in all embodiments. For example, a communication network could potentially include one or more movable BSs such as drone BSs, and the techniques disclosed herein could be applied to inter-BS links that include at least one movable BS.

If all UEs in a communication network can communication with each other and with all BSs, then there are $N_{circ}$ circles in the set $\mathcal{N}_{circ}$ which is given by $$N_{circ} \leq \sum_{k>3} \left( \binom{N_{BS}+N_{UE}}{k} - \binom{N_{BS}}{k} \right) \tag{1-8}$$

where $N_{BS}$ and $N_{UE}$ denote, respectively, the number of BSs in set $\mathcal{N}_{BS}$ and the number of UEs in set $\mathcal{N}_{UE}$, and $$\binom{a}{b}$$

denotes an "a choose b" operation. The term k is constrained to being greater than three in determining $N_{circ}$ because a circle or closed path between any two network elements or nodes v,v' includes those two network elements or nodes and at least one more network element or node.

The set $\mathcal{N}_{circ}$ contains numerous possibilities, examples of which are illustrated in FIGS. 3A, 3B, 3C, and 3D. Although the examples in FIGS. 3A and 3D include inter-BS links, inter-BS ranging is not necessary in communication networks in which all BSs are fixed. For fixed BSs, the ground-truth location of each BS is available and can be used to determine inter-BS ranges. It should be noted, however, that some embodiments may involve one or more movable BSs, which may be treated in the same way as UEs for the purposes of ranging and positioning determination.

In practice, a connectivity graph is much sparser than a connectivity graph for a network in which all UEs can communicate with each other and with all BSs because: (i) only close-by UEs may communicate with each other, (ii) even close-by UEs might not need to establish a SL, and (iii) range estimates on SLs might not be available or may become unreliable or stale.

If $\mathcal{H}_1$ is satisfied in (1-7) for an edge (v,v'), then in some embodiments $w_{v,v'}$ is set to 1; otherwise, if $\mathcal{H}_{0,1}$ is satisfied, then in some embodiments $w_{v,v'}$ is set to 0 to provide an unknown or "indecisive" clue that $\mathcal{H}_{0,1}$ does not imply LoS or NLoS. It should be noted that these values, and others herein, are solely for the purpose of illustration. Other values may be used in other embodiments to indicate LoS, NLoS, or an indecisive result or unknown LoS/NLoS state.

In some embodiments, training for LoS identification with these choices of labels is done through an NN with a three-state output, whereby labels for the third state are obtained through another type of discrepancy check described elsewhere herein. Alternatively, a regression problem may be formed through different choices of labels. In the case of regression problem formulation, considering a link for which (1-5) or (1-7) is not violated, a probability of NLoS is assigned to that link in some embodiments using information from received signal power p, or correlation magnitude if a correlator is used to detect range $$w_{v,v'} = \frac{p_{v,v'}^{-1}}{\sum_{(a,b) \in E_{r^*_{v,v'}}} p_{a,b}^{-1}} \tag{1-9}$$

The logic behind (1-9) is quite intuitive. The larger the power of the eth link, the lower its probability of NLoS, and hence the smaller the value $w_{v,v'}$. Nonetheless, it should be kept in mind that the validity of (1-9) hinges on an assumption that all transmit powers and Automatic Gain Control (AGC) gains are equalized on all the vertices of a connectivity graph. It should also be noted that (1-9) applies to embodiments in which higher values of $w_{v,v'}$ indicate higher probability of NLoS, which need not necessarily be the case in all embodiments. An analogous approach may be developed based on (1-9) for lower values of $w_{v,v'}$ indicating higher probability of NLoS, for example.

In constructing or compiling a training set, a training sample $(x_{v,v'}(t), w_{v,v'}(t))$ is formed for $\forall (v,v') \in E$ at time t, to be added to the training set $\hat{\mathcal{T}} = \hat{\mathcal{T}} \cup \{(x_{v,v'}(t), w_{v,v'}(t))\}$. Note that construction of a training set in some embodiments is an ongoing process that is carried out through a crowdsourcing process that is transparent to UEs. This means that all UEs contribute to evolving the training data without their communications being disrupted. Therefore, no separate, offline surveying step using an expert system (UWB radio, ultrasonic, RADAR, LIDAR, etc.) is needed, in contrast to previous fingerprinting methods.

These label generation techniques exploit spatial diversity. Angular diversity may also or instead be used in other embodiments.

A spatial diversity approach may accurately generate labels for some but not necessarily all links in a communication network. For example, there may be situations in which NLoS exists on one or more edges of the minimum distance path or circle between two nodes or vertices but the condition for the NLoS hypothesis $\mathcal{H}_1$ in (1-7) is not satisfied. Although the number of unlabeled links could potentially be reduced by applying (1-5) to each minimum distance circle in a connectivity graph, this would not address the fact that the spatial diversity approaches above do not generate any clues about LoS links, for hypothesis $\mathcal{H}_0$. Subsequently, an NN trained with such labels, without LoS labels, would be expected to result in a predictor with higher misdetection rate ($P_{MD}$) but lower false alarm rate ($P_{FA}$), defined as $$P_{MD} = \mathcal{P}(\mathcal{H}_0 | \text{Link is NLoS})$$

$$P_{FA} = \mathcal{P}(\mathcal{H}_1 | \text{Link is } LoS) \qquad (1\text{-}10)$$

These two quantities are directly related two important measures of performance in machine learning, known as recall and precision. A better balance between $P_{MD}$ and $P_{FA}$ is often desired, but achieving a better balance involves generating LoS clues and labels as well. According to another aspect of the present disclosure, AoA is estimated at BSs and the law of cosines is used to generate LoS clues and labels.

One reason to concentrate on angular diversity and AoA measurement or estimation at BSs only, and using UL communications, is to abide by the following practical constraint: AoA is measured or estimated relative to broadside of a receiver's antenna or antenna array, which is the reference of the antenna's or array's local coordinate system (LCS). Although a local angle can be converted to a global coordinate system (GCS) if the direction of true North is known, for mobile UEs where orientation is constantly changing, tracking the time-varying offset between antenna or array broadside and true North is possible but can be highly erroneous and processing-intensive. For example, tracking such offset is theoretically possible through readings obtained from 3D gyroscopes inside Inertial Measurement Units (IMUs) at UEs to identify angular shift, along with magnetometer readings to identify the direction of true North, but the level of error in such readings from off-the-shelf IMUs embedded within UEs may be too high to track UE antenna offset with sufficient accuracy for angular diversity techniques as disclosed herein. Aside from this practical aspect, accurate AoA measurement in a multipath environment depends on availability of antenna arrays with a large aperture, and accordingly a large number of physical antenna elements, which is often not feasible at UEs. Therefore, UL AoA estimation or measurement at BSs is primarily considered herein. Angular diversity techniques may also or instead be applied at UEs in other embodiments in which this is feasible.

FIG. 4 includes block diagrams illustrating estimation of range and AoA between a BS and two UEs. The range estimates are over SL, UL, and DL, and AoA estimation is over UL, at the BS. AoA estimation in this example includes angles $\breve{\theta}_{01}$ and $\breve{\theta}_{02}$.

The UE$_2$-BS and UE$_1$-UE$_2$ links are LoS, whereas the UE$_1$-BS link is NLoS, as shown at the left in FIG. 4. The middle diagram in FIG. 4 illustrates a connectivity graph corresponding to the BS and UEs in the left diagram, labeled with range and angle information. On the right in FIG. 4, with $d_{01}, d_{12}, \theta$, two triangles ABC and ABD can be visualized.

In 3D space, the law of cosines defines a mathematical relationship between sides and angles of the triangle ABC in the middle diagram in FIG. 4 as follows:

$$\bar{d}_{02} = d_{01} \cos(\theta) \pm \sqrt{d_{12}^2 - d_{01}^2 \sin^2(\theta)} \qquad (1\text{-}11)$$

where $\theta$ is the solid-angle between the two sides of a triangle measured in steradian. In the connectivity graph shown in the middle diagram in FIG. 4, $d_{a,b} = \tau_{a,b} \cdot C^{EM}$ with $\tau_{a,b}$ denoting the range estimate a, $b \in \{0,1,2\}$ and $C^{EM}$ denoting electromagnetic wave propagation speed, and with the BS indexed as 0 in this example. Also, $\theta = \breve{\theta}_{02} + \breve{\theta}_{01}$ where $\breve{\theta}_{01}$ and $\breve{\theta}_{02}$ are the estimated UL AoAs relative to the broadside of the BS antenna array. The two possibilities in (1-11), given the knowledge of $d_{01}, d_{12}$, and $\theta$, are perhaps best illustrated by sides AD and AC at the right in FIG. 4. In practice, the physical distance of an SL is often in the order of several meters or less, whereas that of UL/DL is in the range of hundreds of meters. In symbol notation, $|SL| \ll \min(|UL|, |DL|)$. This implies that $|AD| \approx 51 |AC|$. As such, $\bar{d}_{02} \leftarrow -0.5(|AD| + |AC|)$ is a reasonable approximation.

When ranges and AoAs are measured with infinite precision, $\bar{d}_{02} = d_{02}$; otherwise, $\bar{d}_{02} \neq d_{02}$. In practice, it is the latter that tends to be the case, for one or both of the following reasons: ranges and AoA can never be measured accurately due to bandwidth limitations and limited length of an antenna array; and NLoS on either of sides AB and AC in FIG. 4 causes a bias on their corresponding range estimates.

From a practical perspective, NLoS causes a much wider discrepancy gap $|\bar{d}_{02} - d_{02}|$ compared to the bandwidth or aperture limitations noted above. This discrepancy forms the basis of providing clues about the LoS state or nature of links. For example, if $|\bar{d}_{02} - d_{02}| \gg 0$, then it can be inferred that AB/AC are NLoS/LoS, or
AB/AC are LoS/NLoS, or
AB/AC are NLoS/NLoS but with unequal NLoS biases.

Alternatively, if $\bar{d}_{02} \approx d_{02}$, then it can be inferred that
AB/AC are LoS/LoS, or
AB/AC are NLoS/NLoS but with equal NLoS biases.

NLoS biases on two independent links are independent random variables, and therefore having equally biased NLoS links is highly improbable. This serves as the basis for the following hypothesis testing criteria $$\begin{cases} \mathcal{H}_0 & \bar{d}_{a,b} \approx d_{a,b} \\ \mathcal{H}_{0,1} & |\bar{d}_{02} - d_{02}| \gg 0 \end{cases} \qquad (1\text{-}12)$$

Although these criteria are based on an assumption that SLs are LoS links, this is an assumption that can often be satisfied with confidence at least because SL communications are between close-by UEs. To potentially increase confidence that the LoS assumption on SL is satisfied, in some embodiments only SLs whose received power is above a confidence threshold are added to a connectivity graph.

To generate labels, in some embodiments a connectivity graph is used to locate all triangular connectivity paths that are found between UEs and BSs, but potentially excluding inter-BS triangles if BSs have fixed locations. There are two different types of triangular connectivity paths that may be found in a connectivity graph, as shown by way of example in FIGS. 5A and 5B. A type (a) triangular connectivity path is between two fixed BSs and one UE as shown in FIG. 5A, and a type (b) path is between one BS and two UEs as discussed in detail above with reference to FIG. 4 and shown in FIG. 5B. No range or AoA estimation is performed between fixed BSs since their known locations and array orientations deliver their distance and AoAs as if virtual range and AoA measurements had been performed. In this case, while the angle between the links connecting UE to the two BSs (denoted by $\theta_{12}$) is not measured directly, it can be estimated from AoA measurements $\theta_{01}$ and $\theta_{02}$ along with fixed BSs' antenna orientations $\eta_1$ and $\eta_2$ according to $\theta_{12}=\pi-\theta_{01}-\theta_{02}-\eta_1-\eta_2$. This information and the fact that the inter-BS link is presumably LoS can be used in (1-12) to assess the presence or absence of LoS. A type (a) path is expected to yield more accurate LoS labels, whereas a type (b) path relies on an assumption of having LoS SL upon which the hypothesis testing in (1-12) can be conducted. The only significant differences between the two types (a) and (b) is that the LoS assumption on the SL in type (b) is replaced by a "virtual" LoS link between BSs in type (a), and the approximation above for (1-11) in the case of an SL link being much shorter than the UE-BS links might not apply, depending on the distance between the BSs in type (a).

To potentially improve confidence on the SL in type (b) being truly LoS, the connectivity graph may be pruned by removing edges corresponding to SLs for which received power falls below a threshold $p^0$. This is a graph with a set of edges given by $$E'=\{E: p_{v,v'}>p^0, v\in\mathcal{N}_{UE}^{v'} \wedge v'\in\mathcal{N}_{UE}^{v}\} \quad (1\text{-}13)$$

where E is given by (1-2) above. With such pruning, only close-by connections participate in establishing triangular connectivity paths, which increases the chance of LoS on SL.

To reduce ambiguity that may remain from NLoS labelling due to "indecisive" spatial diversity labels, such as $w_{v,v'}=0$ in an example above, it is possible to apply the following logic: If a UL/DL edge $(v,v')\in E'$ has already been labelled as an NLoS link, with $w_{v,v'}=1$ in an example above, then it is excluded from further consideration. Otherwise, the hypothesis testing using (1-12) is conducted on $(v,v')$. It should be appreciated, however, that spatial diversity techniques and angular diversity techniques are not dependent upon each other. Although both techniques are based on closed connectivity paths, these techniques could be applied independently of each other and not necessarily in combination.

The same edge in a connectivity graph may be a side to many triangles, and with the evaluation of (1-12) being a threshold-dependent decision, one edge could be identified both LoS and NLoS based on (1-12). With $n_{v,v'}^1$ denoting the number of times an edge $(v,v')$ was identified LoS and $n_{v,v'}^2$ denoting the number of times it was inconclusive, where $n_{v,v'}=n_{v,v'}^1+n_{v,v'}^1$ is the number of connectivity graph triangles of which $v,v'$ is a side, then the following voting is carried out based on $n_{v,v'}$ and $n_{v,v'}^2$ in some embodiments $$w_{v,v'}=\begin{cases} -1 & n_{v,v'}^1 \geq n_{v,v'}^2 \\ 0 & n_{v,v'}^1 < n_{v,v'}^2 \end{cases} \quad (1\text{-}14)$$

where $w_{v,v'}=-1$ denotes LoS and $w_{v,v'}=0$ reflects the indecisive nature of that link. Training an NN with such labelled data, however, may still yield a model that can predict labels for channels with indecisive labels in training data. (1-14) represents one embodiment, and in another embodiment the equality condition $n_{v,v'}^1=n_{v,v'}^2$ is assigned to $w_{v,v'}=0$.

Various embodiments that involve range and/or angle measurement or estimation are described above and elsewhere herein. Range measurement or estimation between UEs need not necessarily be restricted only to Radio Frequency (RF) measurement. Other ranging techniques may also or instead be exploited in order to measure or estimate range, such as ultrasound systems, radar-based ranging, laser distance estimation, and vision/camera processing for example. As long as range estimates between UEs are available, LoS/NLoS labels can be created for training or otherwise developing a model. Similar comments apply to range estimation or measurement between UEs and BSs, and to angle estimation or measurement.

Some embodiments take spatio-temporal information into account. In mobile cellular networks, connectivity changes over time. For generation or collection of labelled data based on connectivity as disclosed herein, it may be preferable for edges to be regularly added to or eliminated from the full connectivity graph. See FIG. 6, for example, which includes block diagrams illustrating another example wireless communication network with a moving UE, and simplified views of connectivity graphs.

Figure 6:
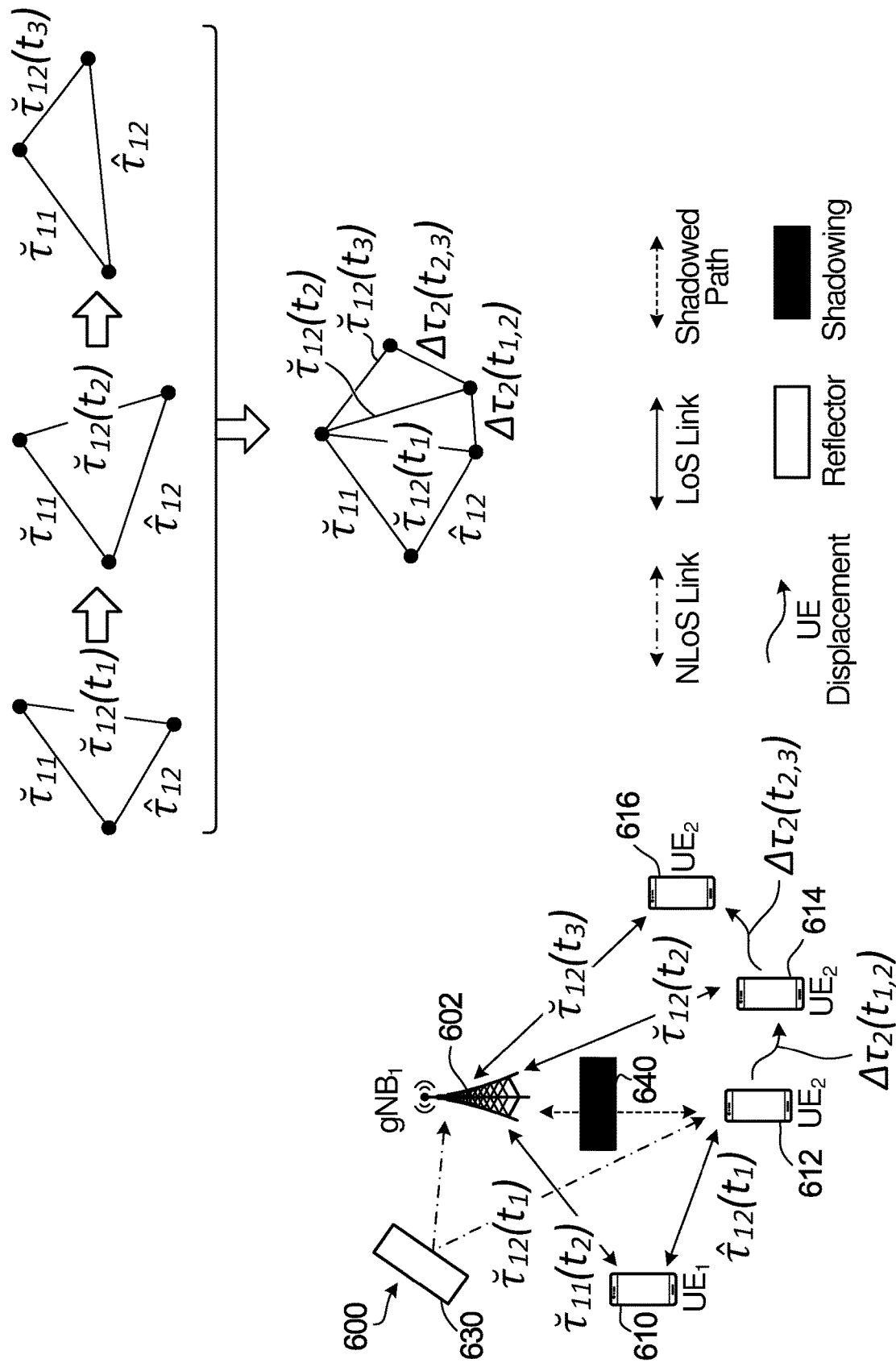
FIG. 6 includes block diagrams illustrating another example wireless communication network with a moving UE, and simplified views of connectivity graphs.

The example wireless communication network shown at 600 in FIG. 6 includes a BS 602, shown by way of example as a gNB, and two UEs. $UE_1$ is stationary at a position 610 in the example shown, and $UE_2$ moves between positions 612, 614, 616 over time. The operating environment of the UEs includes obstacles in the form of a reflector 630 and a shadowing obstacle 640. Links are shown in FIG. 6 in the same way as in FIG. 4.

Range estimates in UL/DL/SL between the BS 602, the stationary $UE_1$ and the mobile $UE_2$ are shown in the network block diagram at 600, simplified connectivity graphs at times $t_1$, $t_2$, $t_3$ are shown at the upper right in FIG. 6, and a simplified spatio-temporal connectivity graph shown at the lower right in FIG. 6. A spatio-temporal connectivity graph may be generated when displacements $\Delta\tau_2(t_{t,t+1})$ are available.

As illustrated in FIG. 6 at 600 and the connectivity graphs at the upper right, edges in the connectivity graph change or "expire" and become stale if UEs change location. It may be that only UEs are aware of their intra-cell and/or intra-beam mobility. For example, tracking at a BS whether or not a UE has moved may involve monitoring the Doppler shift of signals received from that UE, which is erroneous when the UE-BS link is NLoS. Therefore, in some embodiments UEs signal their movement to a BS and/or another component that maintains a connectivity graph so that the connectivity graph can be updated accordingly. Alternatively, if a BS or another component that maintains a connectivity graph knows or can estimate or predict how much a UE has moved within a certain time interval, then edges need not necessarily be removed from a connectivity graph as quickly as in other embodiments, so that spatio-temporal diversity can be exploited. The time interval over which edges are maintained in a connectivity graph instead of being removed after UE movement may depend on such factors as the speed of the UE, whether there is acceleration or sudden turns on the part of UE, etc. As an approximate guide, movement time intervals for spatio-temporal diversity are expected to be on the order of seconds rather than minutes or hours, for example.

Tracking the displacement of UEs is possible through such devices as inertial sensors in IMUs, or odometers in wheel-based systems if a UE is or is associated with a vehicle, for example. Some IMUs are built from micro electro-mechanical sensors that measure the change in capacitance in order to record terminal's line acceleration and angular velocity in three orthogonal directions, for example. For the purposes of connectivity, we are interested in knowing displacement, and only 3D accelerations of a UE $v$, which can be expressed as a vector $a_v(t)=(a_x^v(t), a_y^v(t), a_z^v(t))$, $\forall v\in\mathcal{N}_{UE}$, can be used to derive displacement $$\Delta \tau_v(t, t+\Delta t) = \frac{1}{C^{EM}} \left| \int_t^{t+\Delta t} \int a_v(t') dt' \right|_2, v \in \mathcal{N}_{UE} \quad (1\text{-}15)$$

where $C^{EM}$ denotes electromagnetic wave propagation speed.

A connectivity graph that is obtained or maintained in this way, to retain edges after a UE has moved, may be more dense or much less sparse than a purely spatial connectivity graph, thereby potentially offering more information to tighten bounds of constraints such as (1-6). Higher density of a connectivity graph that exploits spatio-temporal information is readily apparent from a comparison of any of the three individual spatial connectivity graphs at the top right in FIG. 6 with the spatio-temporal connectivity graph at the lower right in FIG. 6, which includes nodes corresponding to all three positions of $UE_2$ and edges associated with all of those positions instead of just one node and associated edges for a single position of $UE_2$.

Such higher density in a connectivity graph may increase the likelihood of generating more accurate NLoS/LoS training labels, and/or being able to generate decisive or definitive labels for more links. The $\Delta \tau_v(t,t+\Delta t)$ displacements may be transmitted by a UE to a BS, a positioning server, and/or another component that maintains a connectivity graph by all UEs, periodically and/or when a UE is moved a certain distance. These displacements can be deemed as virtual range estimates as if the information collected from one UE at multiple different locations at different times had been collected from multiple UEs at those locations in one snapshot, and can be used to make the connectivity graph more connected, denser, or less sparse.

It should be noted that displacement-based updates and retention of edges in a connectivity graph may supplement but not entirely replace other connectivity graph updating. For example, acceleration estimates are noisy and inaccurate because $$a_v(t) = \bar{a}_v(t) + n_v(t) \quad (1\text{-}16)$$

where $\bar{a}_v(t)$ is the ground truth acceleration of a UE and $n_v(t)$ is an additive noise term. This being the case, the double-integration of noise in (1-15) causes the estimated displacements to continuously drift away from actual displacement. Therefore, UEs might also send a "displacement flag" or other indication to a positioning server or other component that maintains a connectivity graph, to signal that sufficient movement has been made since the last update to warrant updated SL range estimates rather than additional displacement-based updates from the UE. A UE could instead just stop sending displacement information and revert to determining and sending a range estimate after a certain number of displacement updates have been sent, a certain amount of time has elapsed since the most recent range estimate, and/or after the UE has been moved by more than a certain distance. These conditions are also examples of conditions that may trigger sending of a displacement flag by a UE. It should also be appreciated that sending a displacement flag and/or otherwise initiating a new range estimate may be performed by one or more other components in a communication network, and not only by a UE.

Turning now to training, in some embodiments an NN is trained, by a positioning server in some embodiments, with a training set $\hat{\mathcal{T}} = \{(x_l, w_l)\}$, which may be continuously incremented. The training set may contain data in UL/DL to/from different BSs and SL among different UEs. This means that a single NN may be trained, rather than having several NNs. If the goal were to predict LoS/NLoS only in UL and DL, then it is possible to have one NN per BS. However, in order to also predict LoS/NLoS on SL, the problem of developing an NN for each UE becomes computationally challenging.

With three-state labels, for NLoS, LoS, and indecisive or unknown as discussed at least above, the problem of LoS identification can be cast as a classification problem. In order to make the classification problem possible, in some embodiments labels are converted to a "one-hot" or a single binary "1" value encoded representation as follows $$w=1 \rightarrow [1,0,0]$$

$$w=0 \rightarrow [0,1,0]$$

$$w=-1 \rightarrow [0,0,1] \quad (1\text{-}17)$$

This is an example only, and other encoding or labeling may be applied in other embodiments.

Figure 7:
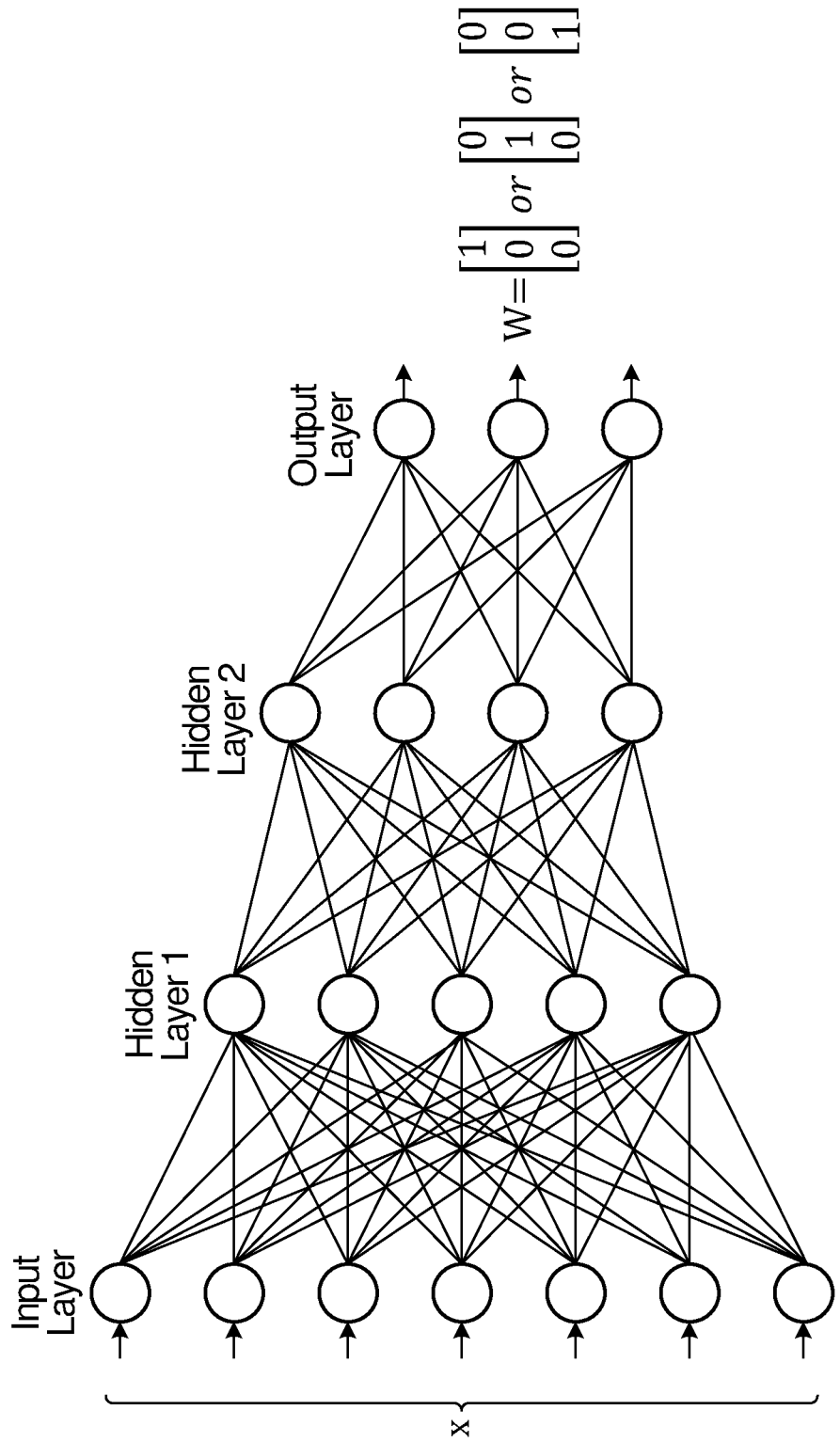
FIG. 7 is a schematic diagram of an example neural network according to an embodiment.

FIG. 7 is a schematic diagram of an example NN according to an embodiment. The example NN in FIG. 7 is a feed forward and Fully Connected NN (FCNN), with several layers to transform an input at the left to a three-state output at the right. In FIG. 7, neurons are shown as circles, branches are shown as lines, and layers are arranged by column. Although a feed forward FCNN as shown in FIG. 7 may be trained using collected training data and used to predict LoS/NLoS status of links, this is just an illustrative example. Other NNs may be used in other embodiments, such as Convolutional NNs (CNNs), Recurrent NNs (RNNs), etc. The present disclosure is not limited to any particular type of NN.

Considering the example NN in FIG. 7, in some embodiments the input to the NN is a cross-covariance tensor x of channel data, vectorized into a long vector $x_l \leftarrow \text{vec}(x_l)$ for training. As described in detail elsewhere herein, collection of training samples may exploit spatial, angular, and/or temporal diversity. Label criteria for generating labels for training data as disclosed above may be summarized as follows $$\begin{cases} \mathcal{H}_1 & \hat{\tau}_{v,v'} \geq d^*_{v,v'} \\ \mathcal{H}_0 & \bar{d}_{a,b} \approx d_{a,b} \\ \mathcal{H}_{0,1} & \hat{\tau}_{v,v'} < d^*_{v,v'} \vee |\bar{d}_{a,b} - d_{a,b}| \gg 0 \end{cases} \Rightarrow \begin{cases} \mathcal{H}_1 & w_{v,v'} = 1 \\ \mathcal{H}_0 & w_{v,v'} = -1 \\ \mathcal{H}_{0,1} & w_{v,v'} = 0 \end{cases}$$

A training sample $(x_{v,v'}(t), w_{v,v'}(t))$ is generated for every edge $(v, v') \in E$ of a connectivity graph to build a training set $\mathcal{T} = \{(x_{v,v'}(t), w_{v,v'}(t))_{v,v',t}\}$ across space and time and labels are encoded according to one-hot encoding in some embodiments, such as for training the example NN in FIG. 7.

The data in the training set are provided to an NN whose loss function is a binary cross-entropy in some embodiments $$\mathcal{L}_1(W) = -\sum_{l=1}^{|\mathcal{T}|} \sum_{p=1}^{3} w_{l,p} \log(f_W^{M1}(x_l)[p]) \quad (1\text{-}18)$$

where $f_W^{M1}(x_l)[p]$ is pth output of the NN, and W denotes the weight tensors, not to be confused with labels $w_l$, of the FCNN at all layers that are to be learned through the following minimization in some embodiments $$W^* = \underset{W}{\operatorname{argmin}} \mathcal{L}_1(W) \qquad (1\text{-}19)$$

Note that for (1-18) to be well-defined, outputs $f_W^{M1}(x_l)$ [p]$\in$[0,1], $\forall$l, p, a constraint that is satisfied if a softmax activation is applied to the output layer, for example.

Once the model is trained, it can be used to infer whether a link is LoS or NLoS. In some embodiments, this involves observing a new channel in UL, DL, or SL to obtain h, applying the same preprocessing as done for training data to get x, and then finding $$\begin{cases} \mathcal{H}_1 & : f_{W^*}^{M1}(x)\ [1] > \max(f_{W^*}^{M1}(x)\ [2], f_{W^*}^{M1}(x)\ [3]) \\ \mathcal{H}_0 & : f_{W^*}^{M1}(x)\ [3] > \max(f_{W^*}^{M1}(x)\ [1], f_{W^*}^{M1}(x)\ [2]) \\ NaN & : f_{W^*}^{M1}(x)\ [2] > \max(f_{W^*}^{M1}(x)\ [1], f_{W^*}^{M1}(x)\ [3]) \end{cases} \qquad (1\text{-}20)$$

where $f_W^{M1*}(x)$ [1$\leq$j$\leq$3] denotes jth output of the 3-states NN, $\mathcal{H}_1$ is the NLoS hypothesis on the link with channel tensor x, $\mathcal{H}_0$ is the LoS hypothesis on the link with channel tensor x, and NaN is a symbol denoting an indecisive state on the link with channel tensor x.

Whereas training is expected to be carried out by network-side strong AI engines with large processing units connected to unlimited power sources as opposed to battery-driven UEs, performing inference can be done by UEs. This may be especially practical in embodiments in which cellular chipsets come with a separate AI unit that can perform inference quickly and efficiently, as is now often the case.

UE-based inference might also be preferred when SL measurements are involved. If UEs are to use NLoS/LoS predictions but do not themselves run the model, then they will have to send live measurements $T_v^{SL} = \{(x_{v,v'}, \check{\tau}_{v,v'}, id_{v'}): v' \in \mathcal{N}_{UE}^v\}$, $v \in V$, or at least signaling indicative of observed channel data, to another component of a communication network so that the model is run to predict whether a link (v,v') is a LoS link or an NLoS link: $w_{v,v'} = f_W^{M2*}(x_{v,v'})$. The channel tensors $x_{v,v'}$ that are used in some embodiments, for example, can be of very high dimension. It can therefore be quite resource intensive for SL inference to be performed at BSs or other network components.

Although $Y_v^{SL}$ are also sent in UL in some embodiments to establish a connectivity graph and generate training data, it should be noted that training and retraining are expected to happen much less frequently than inference. Therefore, a more practical solution, in terms of communication resource usage, may be to transfer the model to UEs once training or retraining is completed. A model for a geographical area that is covered by several BSs, for example, can be broadcast to all UEs for the first time after initial training, instead of being unicast. For subsequent retraining, weights in an NN may be initialized to the most recent optimal configuration, and the NN can then be retrained in substantially the same way as initial training but with a new or updated training set. When retraining is complete, an update such as only the weights that have changed by a certain amount, along with the locations of those weights in the model, may be distributed to UEs.

A model may be defined at least in part in a large database of weights, which may be hundreds of Megabytes to several tens of Gigabytes depending on the capacity of the model. Due to changes in environment caused by such factors as mobility and/or phase-in/phase-out of obstacles such as signal scatterers and reflectors, periodic retraining may be preferred in wireless applications. Although a model may be broadcast or otherwise transferred to UEs in some embodiments to enable UEs to perform inference, it may be impractical to transfer the entire model to each UE every time the model is retrained.

Fortunately, the operating environment in a wireless communication network does not typically change so abruptly as to require full retraining. In some embodiments, a model is retrained with only limited batches of online retraining data. For example, retraining data may be collected only from certain coverage areas that are known or expected to have changed, or only retraining data that is expected to modify some but not all of the NN weights in the model may be collected. Even full retraining using data collected from an entire coverage area is unlikely to change every weight in a model. As such, a positioning server or other network equipment can send to UEs only those weights that changed, or changed significantly by more than a threshold amount, with the positions of those particular weights in the NN model as noted at least above. This can significantly reduce the burden of communicating a large NN model to every UE every time the model is retrained.

Thus, in some embodiments, a full trained model is distributed to UEs only once, and thereafter only changes are distributed to the UEs after retraining.

With the model known at the UE v, the UE can run input data, such as channel data $x_{v,v'}$ that it observed in DL and SL, through the model to predict whether each of the DL and SL links to which it is connected is LoS or NLoS, and form the following sets in an embodiment $$\mathcal{N}_{LoS\text{-}UE}^v = \{v': f_W^*(x_{v,v'}) \approx 1 \wedge v' \in \mathcal{N}_{UE}^v\}$$

$$\mathcal{N}_{LoS\text{-}BS}^v = \{v': f_W^*(x_{v,v'}) \approx 1 \wedge v' \in \mathcal{N}_{BS}^v\}$$

$$\mathcal{N}_{LoS}^v = \{v': f_W^*(x_{v,v'}) \approx 1 \wedge v' \in \mathcal{N}^v\} \qquad (1\text{-}21)$$

According to (1-21), $\mathcal{N}_{LoS\text{-}BS}^v$ and $\mathcal{N}_{LoS\text{-}BS}^v$ are, respectively, the set of all UEs and the set of all BSs, on the full-connectivity graph G, that have an LoS path to v, and $\mathcal{N}_{LoS}^v = \mathcal{N}_{LoS\text{-}UE}^v \cup \mathcal{N}_{LoS\text{-}BS}^v$. In some embodiments, signaling indicative of the set $\mathcal{N}_{LoS}^v$ is then forwarded by all UEs to a network component that maintains a connectivity graph, so that the connectivity graph can be pruned to only retain edges that are associated with LoS links and therefore are not associated with NLoS. This pruned graph can be denoted $G^{LoS} = (V^{LoS}, E^{LoS})$. The same result could be achieved by determining sets that do not include elements of $\mathcal{N}_{LoS\text{-}UE}^v$ and $\mathcal{N}_{LoS\text{-}BS}^v$ and sending signaling that is indicative of such sets. In other words, inference may identify LoS or NLoS/unknown sets, and pruning could be based on indications of LoS or indications of NLoS/unknown.

Several different embodiments are envisioned to integrate aspects of the present disclosure into network architecture, depending on whether inference is to be performed by UEs, and/or at a network side such as by a Location Management Function. It is expected, however, that training using network resources will generally be preferred, given that training can be an extremely resource-intensive process that is not particularly suited to UEs with more limited power, computation resources, and memory.

A positioning server is an example of network equipment by which features disclosed herein may be provided in some embodiments, and includes at least a transmitter and receiver to support communications with other devices such as BSs and/or UEs, and a processor and/or other components configured to support positioning determination. A positioning server is also an example implementation of a Location Management Function (LMF).

A primary goal of LoS identification is to identify NLoS links and exclude them from position estimation. Therefore, an important consideration is how LoS SL range measurements between a UE v and another UE $v' \in \mathcal{N}_{LoS-UE}^{v}$ can be used for positioning determination, with the UE locations $z^v=(z_1^v, z_2^v, z_3^v)$ and $z^{v'}=(z_1^{v'}, z_2^{v'}, z_3^{v'})$ both being unknown. Another application of the proposed LoS identification method is in exploiting the knowledge as to whether a link is NLoS in order to improve robustness of that link for future communications. For instance, if the UE on the transmitting side of an SL knows with high probability that its link to the receiving side is an NLoS link, then it may adjust its Modulation and Coding Scheme (MCS) and/or transmit power, for example, to reduce the likelihood that communications will undergo severe degradation, that retransmission will be necessary, etc.

In some embodiments, collaborative localization is used for UE position determination, based on range estimates performed in UL, DL, and SL along with the known locations of anchors. This is different from current positioning approaches in cellular system where the network localizes each UE through solving a separate optimization problem. Instead, with SL information available, there will be one entangled position estimation problem for many UEs at the same time. This is considered in further detail below with reference to FIG. 8, which is a block diagram of a further example communication network, and illustrates cooperative UE positioning determination.

Figure 8:
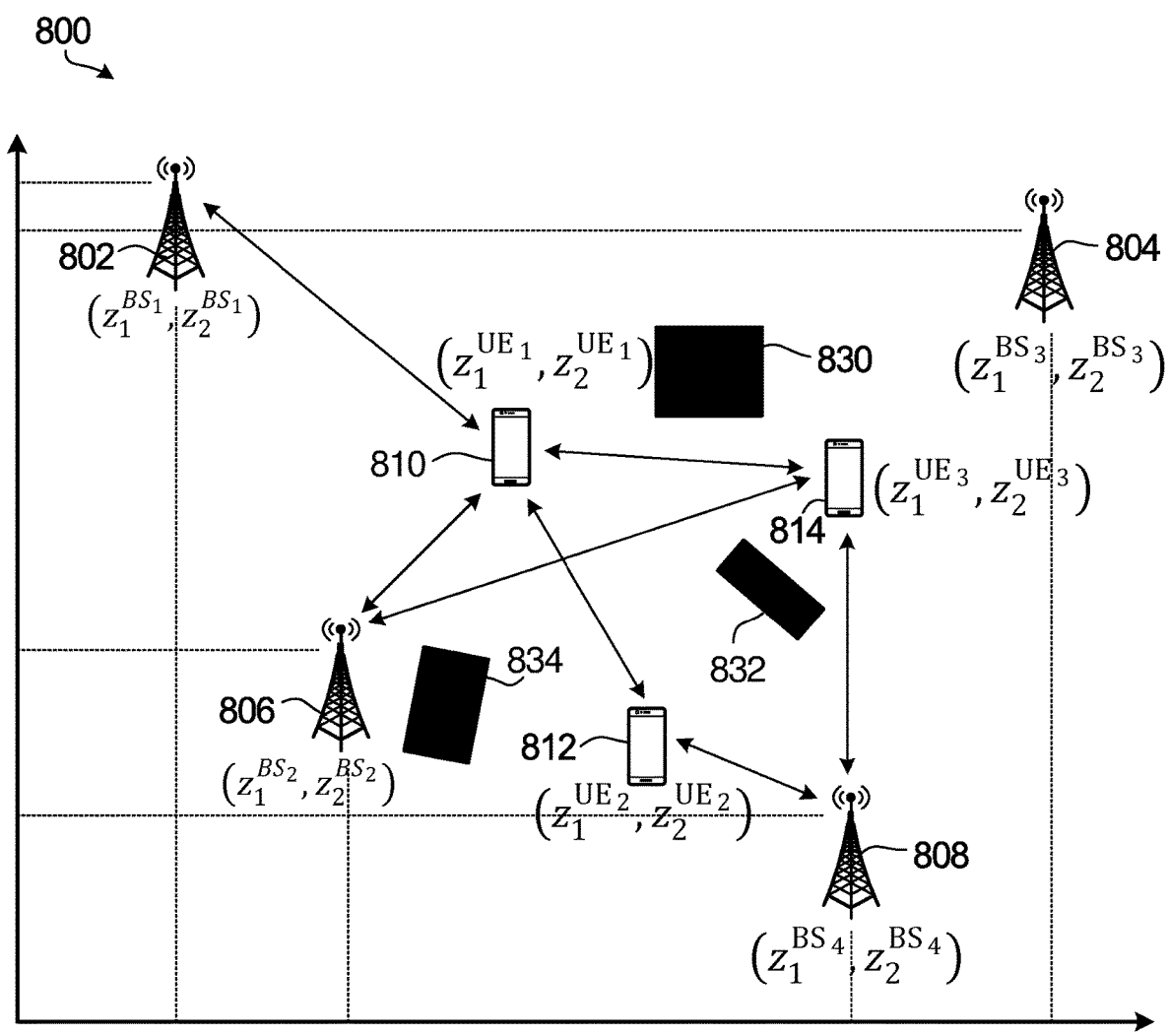
FIG. 8 is a block diagram of a further example communication network, and illustrates cooperative UE positioning determination.

The example wireless communication network 800 includes BSs 802, 804, 806, 808 and UEs 810, 812, 814, and the operating environment of the UEs includes obstacles 830, 832, 834. FIG. 8 is intended to illustrate cooperative localization or positioning determination for three UEs with four BS anchors of known locations ($z_1^{BS_v}, z_2^{BS_v}$), v=1 . . . 4 in 2D space, after identifying NLoS links and eliminating them from the final estimation problem. Therefore, only LoS links are shown in FIG. 8.

Locations of UEs may be considered sensitive information, and therefore in some embodiments joint position estimation for UEs is not performed at UEs but rather at a positioning server or other network equipment so that confidentiality of location information is sustained.

In the most general case, the Maximum Likelihood (ML) formulation of the positioning problem is given by $$\max_{\{z^v, v \in V^{LoS} \setminus N_{BS}\}} \text{Loss} = \prod_{t=1}^{T} \prod_{(a,b) \in E^{LoS}} \mathcal{L}(\tau_{a,b}(t) \mid z^a, z^b) \quad (1\text{-}22)$$

where T samples from each snapshot of the network are collected within a stationarity region in some embodiments in order to smooth the estimation. Assuming the measurement model induces Gaussian noise with similar variance, (1-22) reduces to a Minimum Mean Squared Error (MMSE) problem $$\min_{\{z^v, v \in V^{LoS} \setminus N_{BS}\}} -\log(\text{Loss}) = \quad (1\text{-}23)$$

$$\prod_{t=1}^{T} \prod_{(a,b) \in E^{LoS}} \left(\tau_{a,b}(t) - \frac{1}{C^{EM}} |z^a, z^b|_2\right)^2$$

This is a non-convex optimization problem that is commonly encountered in the positioning domain. There are also other approaches to solve this problem, through a message passing algorithm for example.

Figure 9:
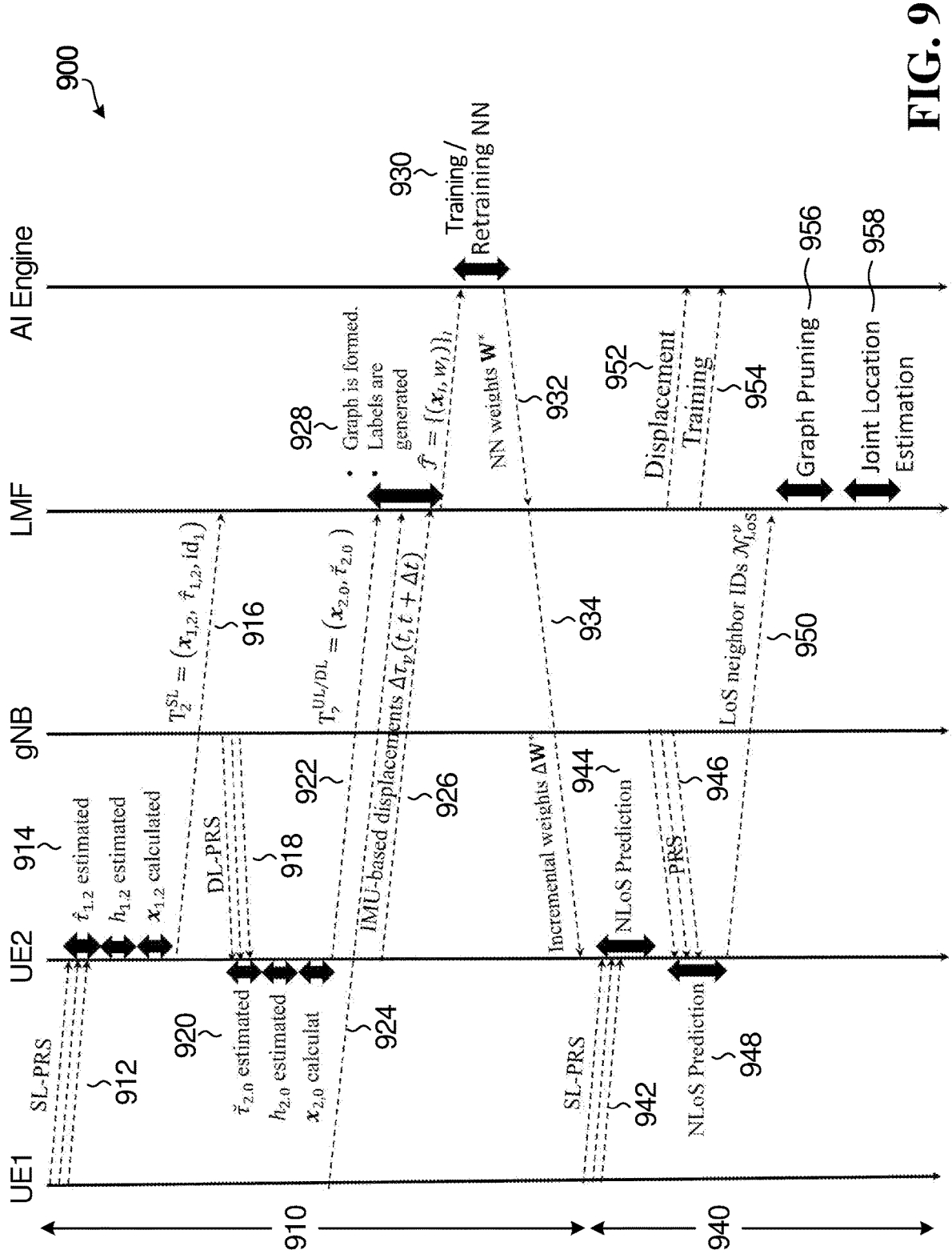
FIG. 9 is a signal flow diagram illustrating signaling according to an embodiment.

Various embodiments are described in detail above, primarily in the context of how elements in a communication network operate and interact. FIG. 9 is a signal flow diagram illustrating signaling according to an embodiment. Other embodiments may involve similar signaling, at least during initial stages of training for example.

In the signal flow diagram 900, two UEs including UE1 and UE2, a gNB, an LMF, and an AI engine are involved in a training phase 910. The gNB, the LMF, and the AI engine are network-side components, and may be implemented together in network equipment or separately. Although only two UEs and only one gNB are shown in FIG. 9 to avoid congestion in the drawing, data collection during training, and similarly operation of a communication network, are expected to involve more than two UEs and more than one gNB.

Reference signaling from UE1, shown by way of example as SL Positioning Reference Signal (PRS) signaling, is transmitted to UE2 at 912. Based on this reference signaling, at 914 UE2 estimates SL range and channel data, and calculates a channel tensor in the example shown. UE2 also transmits signaling to the LMF at 916. The signaling includes or is otherwise indicative of the SL channel tensor, the SL range estimate, and an identifier $id_1$ of UE1. UE2 also receives DL-PRS reference signaling from the gNB as shown at 918, estimates range and channel data and calculates a channel sensor for the DL from the gNB at 920, and transmits, to the LMF at 922, signaling that includes or is otherwise indicative of the DL channel tensor and the DL range estimate, and in some embodiments an identifier (not shown) of the gNB. The transmission at 922 is labeled as "UL/DL" in the drawing, which would be the case in embodiments with UL/DL channel reciprocity. DL channel tensors and range estimates for a UE-BS pair may or may not apply to UL between the same UE-BS pair.

It should also be noted that UE1 and/or the gNB may similarly receive reference signaling, estimate or calculate range, channel data, and channel tensors for one or more links, and transmit signaling to the LMF. This is not shown in FIG. 9 to avoid further congestion in the drawing.

At 924, 926, FIG. 9 illustrates optional signaling indicative of IMU-based displacements by the UEs to the LMF.

Connectivity graph generation and label generation by the LMF, based on received signaling, is shown at 928. A training data set that includes or is otherwise indicative of channel tensors and generated labels is signaled to the AI engine by the LMF, and is used in training an NN-based model at 930. NN weights are signaled to the LMF at 932. In the embodiment shown, the NN weights, or at least changed weights in the case of retraining, are also signaled to UE2 at 934, and may be broadcast to all UEs. It should be noted that not all embodiments involve inferencing at UEs and therefore NN weights need not necessarily be signaled to a UE in all embodiments.

In an operations phase or stage 940 in the example shown, inferencing is performed at UE2. UE2 receives SL-PRS signaling 942 from UE1, and performs SL NLoS prediction at 944 based on the received signaling. Although not explicitly shown at 944 to avoid further congestion in the drawing, UE2 may estimate channel data based on the reference signaling received at 942 and calculate a channel tensor for input to an NN based on the channel data. Similarly, DL NLoS prediction may be performed by UE2 at 948 based on PRS signaling 946 received from the gNB.

FIG. 9 also illustrates optional signaling from UE2 to the LMF at 950. The signaling at 950 includes or is otherwise indicative of UEs and/or BSs, such as either or both of UE1 and the gNB in FIG. 9, with which UE2 has a LoS link. This signaling is shown by way of example as including LoS neighbor IDs, but other forms of signaling are also possible.

The signaling at 950 enables pruning of a connectivity graph by the LMF, as shown at 956. Positioning determination or location estimation as shown at 958 is not necessarily dependent upon graph pruning at 956 in all embodiments.

Retraining may be initiated in response to any of various conditions, and two examples of signaling that may initiate retraining are shown at 952, 954. A displacement flag, as indicated above, may be signaled by UE that has been providing displacement updates. The displacement flag 952 in FIG. 9 is illustrated as being signaled to the AI engine by the LMF, as another example. A decision to halt or suspend displacement updates and retrain a model may be made at the LMF, or another component, and not at a UE or at least not only at a UE.

Signaling of a new or updated batch of training data at 954 may also or instead trigger retraining. PRS signaling may be communicated between UEs and BSs during normal operations associated with establishing and/or maintaining links, and accordingly training data collection and label generation may be ongoing, so that a new or updated training data set is available whenever retraining is to be performed. Retraining may be requested or initiated by any of the components illustrated in FIG. 9 or automatically, based on any one or more of: a threshold amount of time since previous training or retraining, movement of one or more UEs by more than a threshold distance, an error detection rate above a threshold, and/or any of various other factors, for example.

Retraining may proceed in much the same manner as shown at 910 in FIG. 9, although in the case of retraining it is possible that only changed NN weights and their locations within the model are signaled to UEs at 934 and/or to the LMF at 932. NN weights before and after retraining may be compared, by the LMF for example, to detect changed weights or weights that have changed by more than a threshold amount, to be signaled to UEs.

Other variations in FIG. 9 are also possible. For example, NN weights need not be distributed to UEs if inferencing is performed at the network side, by the LMF in in FIG. 9 for example. During the operations phase 940, a UE may transmit an SL and/or DL channel tensor to the LMF, and the LMF then performs NLoS inferencing for the SL and/or DL and signals information indicative of the results back to the UE and/or to one or more other components that are to use the results.

There are also various options for the signaling shown in FIG. 9. For example, range estimates, channel tensors, and possibly displacements are to be sent by UEs in uplink, to an LMF in some embodiments. Network equipment such as the gNB may advise each UE as to whether the UE is to communicate signaling associated with such information and if so, on which communication resources. This may be done by allocating a portion of format0 Downlink Control Information (DCI) in Physical Downlink Control Channel (PDCCH) to this task, for example. Each UE can use the common and dedicated search space in order to decode DCI to determine whether it is obliged to send range, tensor, and/or displacements, and over which resources.

When an NN model is to be transferred to UEs, this may be done by broadcast. To broadcast the model, which is expected to happen infrequently, UEs need to be able to determine the communication resources over which they can recover the model. Given the fact that NN models are expected to include millions of parameters, model transfer to transmit an entire model, or even a part of a model, might not be done through PDCCH due to the limitations of resources. One possible option is to use format1 at DCI to inform UEs as to the resources, such as Resource Blocks (RBs), during which symbols will carry weights of a model so that each UE can recover the model. In one embodiment, once the model is available at UEs, inference is performed at the UEs. To the extent that inferred LoS status information is to be signaled to one or more network components such as the LMF as shown at 950, Uplink Control Information (UCI) may be used to declare to the network component(s) the resources, such as RBs and symbols, of a UE carry that information.

Various embodiments are described in detail above. Disclosed features may be implemented in any of various ways and/or in any of various subsets or combinations, as described by way of example below. FIG. 10 is a flow chart illustrating an example of a method performed by a first UE in an embodiment.

The example method 1000 includes receiving, at 1002, signaling that is associated with a direct wireless communication link between the first UE and a second UE. In an embodiment, signaling that is associated with a direct wireless communication link may be or include SL-PRS signaling, as shown by way of example at 912 in FIG. 9. The example method 1000 also involves transmitting, at 1004, to network equipment in the wireless communication network, signaling that includes or is otherwise indicative of an estimate of range between the first UE and the second UE. The estimate of range is based on the received signaling. Signaling indicative of a range estimate is shown by way of example at 916 in FIG. 9.

The network equipment to which the signaling is transmitted at 1004 may be, for example, a base station or other network equipment that is configured to build or maintain a connectivity graph or is otherwise involved in training or developing a prediction model as disclosed herein. The network equipment may implement an LMF as shown in FIG. 9, for example. In other embodiments, the network equipment to which the signaling is transmitted at 1004 is not itself directly involved in building or maintain a connectivity graph or is otherwise involved in training or developing a prediction model. A UE may transmit signaling at 1004 to a base station, which in turn relays that signaling to an LMF, for example.

The signaling that is transmitted at 1004 may include or otherwise be indicative of other information. For example, in some embodiments such signaling is further indicative of channel data estimated based on the received signaling. The channel data may be or include, for example, a transformed version of raw channel data that is estimated based on the received signaling. Chanel tensors referenced herein represent an example of such transformed raw channel data. An identifier as shown at 916 in FIG. 9 is another example of additional information that may be included or otherwise indicated in the signaling that is transmitted at 1004.

Other operations may be performed in some embodiments. An example is shown at 1006, which involves transmitting to the network equipment signaling that is indicative of displacement of the first UE subsequent to transmitting the signaling indicative of an estimate of range at 1004. This is shown by way of example as IMU-based displacements at 924, 926 in FIG. 9.

These operations in FIG. 10 may be repeated, for multiple links, multiple UE positions, and/or retraining of a prediction model for example, as illustrated by the dashed return arrows between 1004, 1002 and 1006, 1002.

Some embodiments also or instead involve receiving signaling that is associated with a downlink communication link between the first UE and a network component in the wireless communication network. The network component from which such signaling is received may be, but need not necessarily be, the network equipment to which the signaling is transmitted at 1004. For example, as shown in FIG. 9, signaling indicative of a range estimate may be transmitted by UE2 to the LMF at 916, but UE2 receives signaling associated with a downlink communication link from the gNB at 918.

As shown by way of example at 922 in FIG. 9, a method may also involve transmitting, to the network equipment to which signaling was transmitted at 1004, additional signaling that is indicative of an estimate of range between the first UE and the network component. The estimate of range between the first UE and the network component is based on the received signaling that is associated with the downlink communication link. The additional signaling may also be indicative of other information, such as downlink channel data that is estimated based on the received signaling that is associated with the downlink communication link. An example of such downlink channel data is a transformed version of raw channel data that is estimated based on the received signaling that is associated with the downlink communication link, such as a downlink channel sensor. The additional signaling may also be indicative of an identifier of the network component and/or the downlink communication link.

In some embodiments, at 1008 a UE obtains a prediction model for prediction of LoS status of communication links, and prediction or inference is performed at a UE. Although a UE may itself train or otherwise develop a prediction model, it is expected that a prediction model will be developed at a network side. A UE may, for example, receive at 1008 signaling that is indicative of a prediction model. The prediction model is based in part on the estimate of range that is indicated in the signaling transmitted at 1004 as disclosed elsewhere herein, and the signaling may be received from the network equipment to which the signaling is transmitted at 1004.

It should be noted that 1006 and 1008 are intentionally not connected in FIG. 10, to illustrate that a UE that obtains a prediction model at 1008 need not necessarily have been involved in training or otherwise developing that prediction model by transmitting signaling to network equipment at 1004, 1006.

For prediction or inference based on the prediction model, at 1010 a UE receives signaling associated with a communication link. The signaling may be or include a channel tensor for example. Based on the signaling received at 1010, a prediction LoS status of the communication link is obtained from the prediction model. At 1012, signaling that includes or is otherwise indicative of the prediction is transmitted. The prediction signaling may be transmitted from a UE to an LMF for pruning, for example.

The prediction-related operations in FIG. 10 may be repeated. For example, predictions may be obtained from the prediction model for multiple links, as illustrated by the dashed return arrow between 1012 and 1010. The prediction model may be replaced or updated in some embodiments, with a subset of weights that have changed as a result of retraining for example, and this is illustrated in FIG. 10 by the dashed return arrow between 1012 and 1008.

Other embodiments may include additional, fewer, and/or different operations, performed in a similar or different order.

FIG. 11 is a flow chart illustrating an example of a method performed by network equipment in an embodiment. The example method 1100 is intended to be illustrative of a method that may be performed at any of various types of network equipment. Consider, for example, the operations 1102, 1106, and 1108, which relate to receiving signaling that is indicative of an estimate of range, obtaining a prediction model, and transmitting signaling that is indicative of the prediction model. These operations could be performed, for example, at a BS, an LMF, or an AI engine.

With reference to FIG. 9, the LMF may receive signaling that is indicative of an estimate of range associated with a direct wireless communication link between a first UE and a second UE in a wireless communication network, in particular UE1 and UE2, as shown at 916. The LMF may also obtain a prediction model, from the AI engine in this example, by receiving signaling that is indicative of the model, in the form of the weights at 932 in the example shown. The prediction model is for prediction of LoS status of communication links in the wireless communication network, as disclosed elsewhere herein. The signaling at 934 is illustrative of transmitted signaling that is indicative of the prediction model. This is one example implementation of the operations 1102, 1106, 1108 in FIG. 11.

Turning to the gNB in FIG. 9, UE2 may transmit signaling, which is indicative of an estimate of range associated with an SL between UE1 and UE2, to the LMF through the gNB, and similarly signaling indicative of the prediction model may be transmitted to UE2 through the gNB. At least in this sense, the gNB may perform the operation 1102 by receiving range estimate signaling from UE2, the operation 1106 by receiving prediction model signaling from the LMF, and the operation 1108 by transmitting the prediction model signaling to UE2.

An AI engine as shown in FIG. 9 may similarly receive signaling, obtain a prediction model by training, and transmit signaling that is indicative of the prediction model.

Thus, these and/or other operations illustrated in FIG. 11 are not necessarily limited to any particular type of network equipment. In some embodiments, operations such as those shown in FIG. 11 may even be performed elsewhere, including at one or more UEs if UE-side prediction model development and/or inference are supported for example.

FIG. 11 also illustrates, at 1112, transmission of signaling that is indicative of a prediction from the prediction model. A method may include either or both of 1108, 1112. In other words, a method may involve transmitting one or more of: signaling indicative of a prediction model for prediction of LoS status of communication links in the wireless communication network, and signaling indicative of a prediction, from the prediction model, of LoS status of one or more communication links in the wireless communication network. In either case, the prediction model is based in part on the estimate of range between the first UE and the second UE.

The signaling received at 1102 may also be indicative of other information, such as channel data that is estimated for the direct wireless communication link and/or an identifier, as disclosed elsewhere herein. The signaling received at 1110 may also or instead be indicative of channel data such as a channel tensor, for a communication link for which a prediction is to be made using the prediction model.

A method may include other operations. An example is shown at 1104, and involves receiving signaling that is indicative of displacement of the first UE subsequent to determination by the first UE of the estimate of range for which signaling is received at 1102. As described elsewhere herein, such a displacement estimate may be used in training or otherwise obtaining a prediction model.

In some embodiments, a method also involves receiving signaling that is indicative of an estimate of range associated with a downlink communication link between a UE and a network component in the wireless communication network, in which case the prediction model is further based on the estimate of range associated with the downlink communication link. For example, a range estimate associated with a downlink communication link may be determined by a UE, and signaling indicative of a downlink range estimate may be received from a UE, as shown by way of example at 922 in FIG. 9. Other information may also be included or otherwise indicated in such signaling, and examples of such information are described elsewhere herein.

A method may involve receiving, from one or more UEs and/or other components in a wireless communication network, signaling that is indicative respective estimates of range associated with multiple direct wireless communication links, including links of further UEs in a wireless communication network. The prediction model may then also be based on those estimates of range associated with the direct wireless communication links of the further UEs.

Signaling need not be associated only with direct wireless communication links. Downlink communication links are noted above as an example. More generally, in some embodiments a method also involves receiving, from network components in the wireless communication network for example, signaling that is indicative respective estimates of range associated with network communication links of the network components. These network communication links may include downlink and/or uplink communication links. In such embodiments, the prediction model is also based on these estimates of range associated with the network communication links.

Estimates of range may be used directly in obtaining a model. Other embodiments involve generating training data for training the prediction model based in part on range estimates, such as the estimate of range between the first UE and the second UE as indicated in the signaling received at 1102. Examples of how training data may be generated are provided elsewhere herein.

Additional signaling indicative of further estimates of range associated with further communication links may be received, from one or more of further UEs in the wireless communication network and network components in the wireless communication network for example. Generating training data may then involve exploiting one or more of: spatial diversity, angular diversity, and temporal diversity based on the received signaling and the received additional signaling.

In the context of such additional signaling, generating training data may also or instead involve generating the training data based on closed connectivity paths between three or more elements of the wireless communication network, including UEs and other network components of the wireless communication network. Examples of closed connectivity paths and how they may be used in generating training data are provided elsewhere herein. Such paths that include at least one UE and at least two other network components, which may include one or more UEs and/or one or more other types of network components such as BSs or gNBs for example, can be particularly useful in distinguishing LoS paths from NLoS paths.

Other operations may also or instead be performed. For example, the dashed return arrow between 1106 and 1102 is intended to illustrate such features as receipt of signaling indicative of range estimates for multiple links, receipt of signaling associated with multiple displacement updates for one or more UEs, and retraining. The dashed return arrow between 1112 and 1110 is similarly intended to illustrate operations that may be repeated during prediction or inference using a prediction model. Signaling indicative of channel tensors for respective communication links, for example, may be received at 1110 and signaling indicative of respective LoS predictions for those communication links may be transmitted at 1112. More generally, methods consistent with the present disclosure may include additional, fewer, and/or different operations, performed in a similar or different order.

Figure 12:
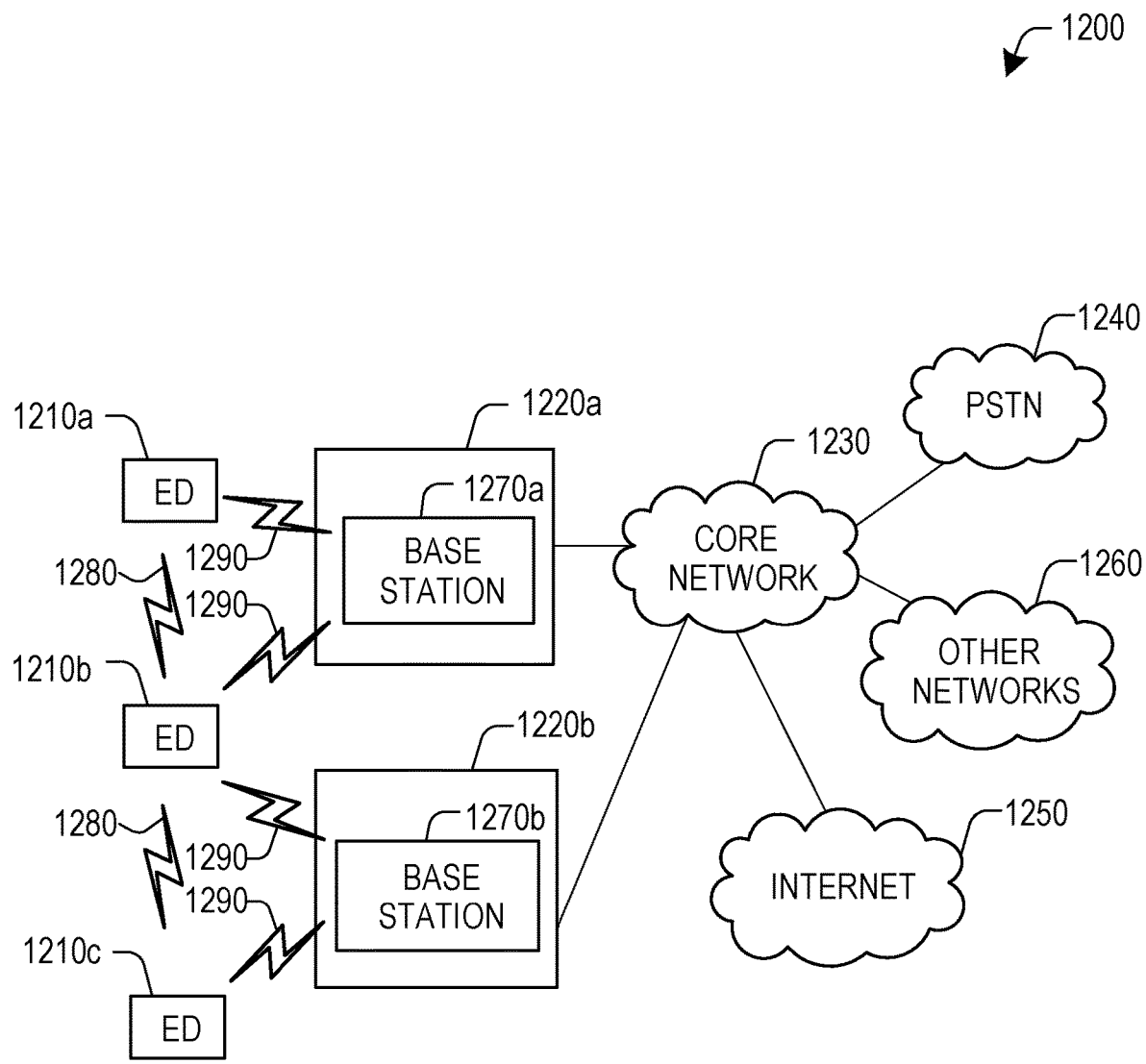
FIG. 12 illustrates an example communication system in which embodiments of the present disclosure could be implemented.

Various embodiments are disclosed by way of example above. FIG. 12 illustrates an example communication system 1200 in which embodiments of the present disclosure could be implemented. In general, the communication system 1200 enables multiple wireless or wired elements to communicate data and other content. The purpose of the communication system 1200 may be to provide content (voice, data, video, text) via broadcast, narrowcast, user device to user device, etc. The communication system 1200 may operate by sharing resources such as bandwidth.

In this example, the communication system 1200 includes electronic devices (ED) 1210*a*-1210*c*, radio access networks (RANs) 1220*a*-1220*b*, a core network 1230, a public switched telephone network (PSTN) 1240, the internet 1250, and other networks 1260. Although certain numbers of these components or elements are shown in FIG. 12, any reasonable number of these components or elements may be included in the communication system 1200.

The EDs 1210*a*-1210*c* are configured to operate, communicate, or both, in the communication system 1200. For example, the EDs 1210*a*-1210*c* are configured to transmit, receive, or both via wireless or wired communication channels. Each ED 1210*a*-1210*c* represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 12, the RANs 1220*a*-1220*b* include base stations 1270*a*-1270*b*, respectively. Each base station 1270*a*-1270*b* is configured to wirelessly interface with one or more of the EDs 1210*a*-1210*c* to enable access to any other base station 1270*a*-1270*b*, the core network 1230, the PSTN 1240, the internet 1250, and/or the other networks 1260. For example, the base stations 1270*a*-1270*b* may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 1210*a*-1210*c* may be alternatively or additionally configured to interface, access, or communicate with any other base station 1270*a*-1270*b*, the internet 1250, the core network 1230, the PSTN 1240, the other networks 1260, or any combination thereof. The communication system 1200 may include RANs wherein the corresponding base station accesses the core network 1230 via the internet 1250. In some embodiments the EDs 1210a-1210c include EDs that are able to communicate directly with each other through links 1280, which are referred to herein primarily as SLs.

The EDs 1210a-1210c and base stations 1270a-1270b are examples of communication equipment that can be configured to implement some or all of the functionality and/or embodiments described herein. In the embodiment shown in FIG. 12, the base station 1270a forms part of the RAN 1220a, which may include other base stations, base station controller(s) (BSC), radio network controller(s) (RNC), relay nodes, elements, and/or devices. Any base station 1270a, 1270b may be a single element, as shown, or multiple elements, distributed in the corresponding RAN, or otherwise. Also, the base station 1270b forms part of the RAN 1220b, which may include other base stations, elements, and/or devices. Each base station 1270a-1270b transmits and/or receives wireless signals within a particular geographic region or area, sometimes referred to as a "cell" or "coverage area". A cell may be further divided into cell sectors, and a base station 1270a-1270b may, for example, employ multiple transceivers to provide service to multiple sectors. In some embodiments there may be established pico or femto cells where the radio access technology supports such cells. In some embodiments, multiple transceivers could be used for each cell, for example using MIMO technology. The number of RANs 1220a-1220b shown is an example only. Any number of RANs may be contemplated when devising the communication system 1200.

The base stations 1270a-1270b communicate with one or more of the EDs 1210a-1210c over one or more air interfaces 12120 using wireless communication links e.g. radio frequency (RF), microwave, infrared (IR), etc. The air interfaces 1290 may utilize any suitable radio access technology. For example, the communication system 1200 may implement one or more channel access methods, such as code division multiple access (CDMA), time division multiple access (TDMA), frequency division multiple access (FDMA), orthogonal frequency division multiple access (OFDMA), or single-carrier FDMA (SC-FDMA) in the air interfaces 1290.

A base station 1270a-1270b may implement Universal Mobile Telecommunication System (UMTS) Terrestrial Radio Access (UTRA) to establish an air interface 1290 using wideband CDMA (WCDMA). In doing so, the base station 1270a-1270b may implement protocols such as HSPA, HSPA+ optionally including HSDPA, HSUPA or both. Alternatively, a base station 1270a-1270b may establish an air interface 1290 with Evolved UTMS Terrestrial Radio Access (E-UTRA) using LTE, LTE-A, and/or LTE-B. It is contemplated that the communication system 1200 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 1220a-1220b are in communication with the core network 1230 to provide the EDs 1210a-1210c with various services such as voice, data, and other services. The RANs 1220a-1220b and/or the core network 1230 may be in direct or indirect communication with one or more other RANs (not shown), which may or may not be directly served by core network 1230, and may or may not employ the same radio access technology as RAN 1220a, RAN 1220b or both. The core network 1230 may also serve as a gateway access between (i) the RANs 1220a-1220b or EDs 1210a-1210c or both, and (ii) other networks (such as the PSTN 1240, the internet 1250, and the other networks 1260). In addition, some or all of the EDs 1210a-1210c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 1250. PSTN 1240 may include circuit switched telephone networks for providing plain old telephone service (POTS). Internet 1250 may include a network of computers and subnets (intranets) or both, and incorporate protocols, such as IP, TCP, UDP. EDs 1210a-1210c may be multimode devices capable of operation according to multiple radio access technologies, and incorporate multiple transceivers necessary to support such radio access technologies.

Figure 13A:
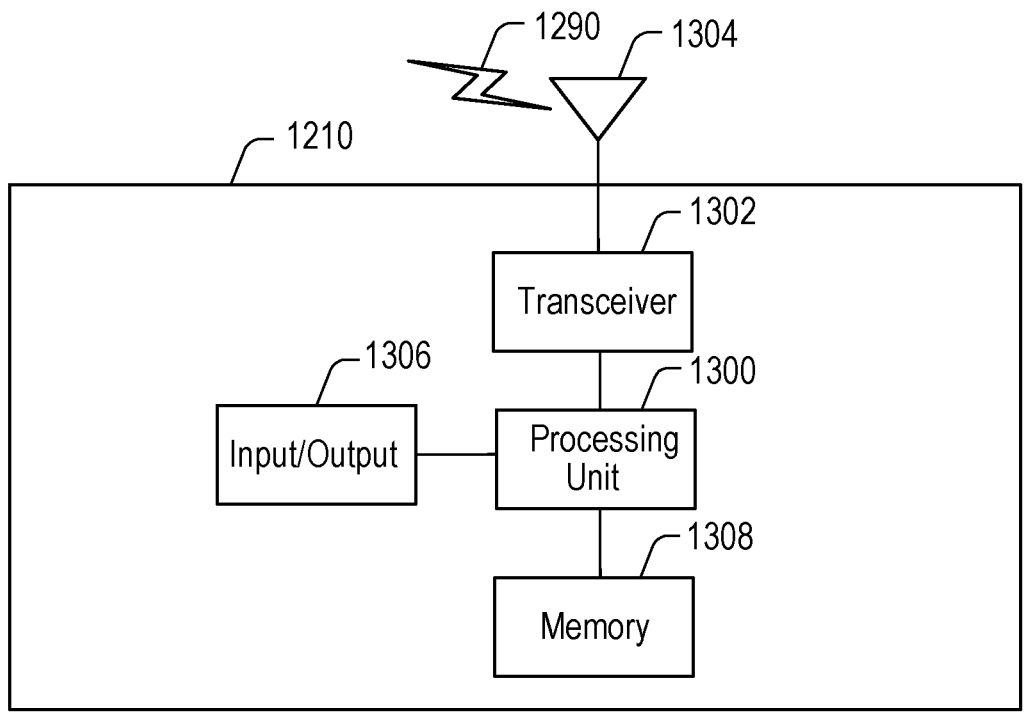
FIG. 13A is a block diagram of an example electronic device.
Figure 13B:
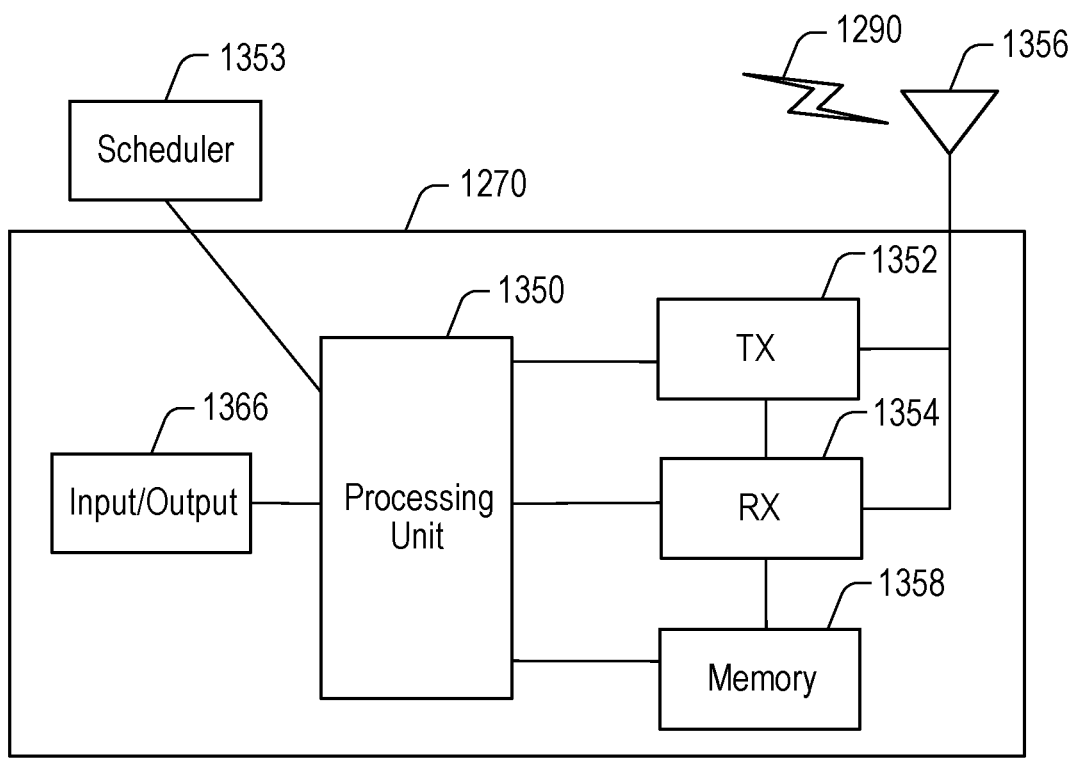
FIG. 13B is a block diagram of an example base station.

FIGS. 13A and 13B illustrate example devices that may implement the methods and teachings according to this disclosure. In particular, FIG. 13A illustrates an example ED 1210, and FIG. 13B illustrates an example base station 1270. These components could be used in the communication system 1200 or in any other suitable system.

As shown in FIG. 13A, the ED 1210 includes at least one processing unit 1300. The processing unit 1300 implements various processing operations of the ED 1210. For example, the processing unit 1300 could perform signal coding, data processing, power control, input/output processing, or any other functionality enabling the ED 1210 to operate in the communication system 1200. The processing unit 1300 may also be configured to implement some or all of the functionality and/or embodiments described in more detail elsewhere herein. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1210 also includes at least one transceiver 1302. The transceiver 1302 is configured to modulate data or other content for transmission by at least one antenna or Network Interface Controller (NIC) 1304. The transceiver 1302 is also configured to demodulate data or other content received by the at least one antenna 1304. Each transceiver 1302 includes any suitable structure for generating signals for wireless or wired transmission and/or processing signals received wirelessly or by wire. Each antenna 1304 includes any suitable structure for transmitting and/or receiving wireless or wired signals. One or multiple transceivers 1302 could be used in the ED 1210. One or multiple antennas 1304 could be used in the ED 1210. Although shown as a single functional unit, a transceiver 1302 could also be implemented using at least one transmitter and at least one separate receiver.

The ED 1210 further includes one or more input/output devices 1306 or interfaces (such as a wired interface to the internet 1250 in FIG. 12). The input/output devices 1306 permit interaction with a user or other devices in the network. Each input/output device 1306 includes any suitable structure for providing information to or receiving information from a user, such as a speaker, microphone, keypad, keyboard, display, or touch screen, including network interface communications.

In addition, the ED 1210 includes at least one memory 1308. The memory 1308 stores instructions and data used, generated, or collected by the ED 1210. For example, the memory 1308 could store software instructions or modules configured to implement some or all of the functionality and/or embodiments described herein and that are executed by the processing unit(s) 1300. Each memory 1308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the base station 1270 includes at least one processing unit 1350, at least one transmitter 1352, at least one receiver 1354, one or more antennas 1356, at least one memory 1358, and one or more input/output devices or interfaces 1366. A transceiver, not shown, may be used instead of the transmitter 1352 and receiver 1354. A scheduler 1353 may be coupled to the processing unit 1350. The scheduler 1353 may be included within or operated separately from the base station 1270. The processing unit 1350 implements various processing operations of the base station 1270, such as signal coding, data processing, power control, input/output processing, or any other functionality. The processing unit 1350 can also be configured to implement some or all of the functionality and/or embodiments described in more detail herein. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transmitter 1352 includes any suitable structure for generating signals for wireless or wired transmission to one or more EDs or other devices. Each receiver 1354 includes any suitable structure for processing signals received wirelessly or by wire from one or more EDs or other devices. Although shown as separate components, at least one transmitter 1352 and at least one receiver 1354 could be combined into a transceiver. Each antenna 1356 includes any suitable structure for transmitting and/or receiving wireless or wired signals. Although a common antenna 1356 is shown here as being coupled to both the transmitter 1352 and the receiver 1354, one or more antennas 1356 could be coupled to the transmitter(s) 1352, and one or more separate antennas 1356 could be coupled to the receiver(s) 1354. Each memory 1358 includes any suitable volatile and/or non-volatile storage and retrieval device(s) such as those described above in connection to the ED 1210 in FIG. 13A. The memory 1358 stores instructions and data used, generated, or collected by the base station 1270. For example, the memory 1358 could store software instructions or modules configured to implement some or all of the functionality and/or embodiments described herein and that are executed by the processing unit(s) 1350.

Each input/output device 1366 permits interaction with a user or other devices in the network. Each input/output device 1366 includes any suitable structure for providing information to or receiving/providing information from a user, including network interface communications.

Figure 14:
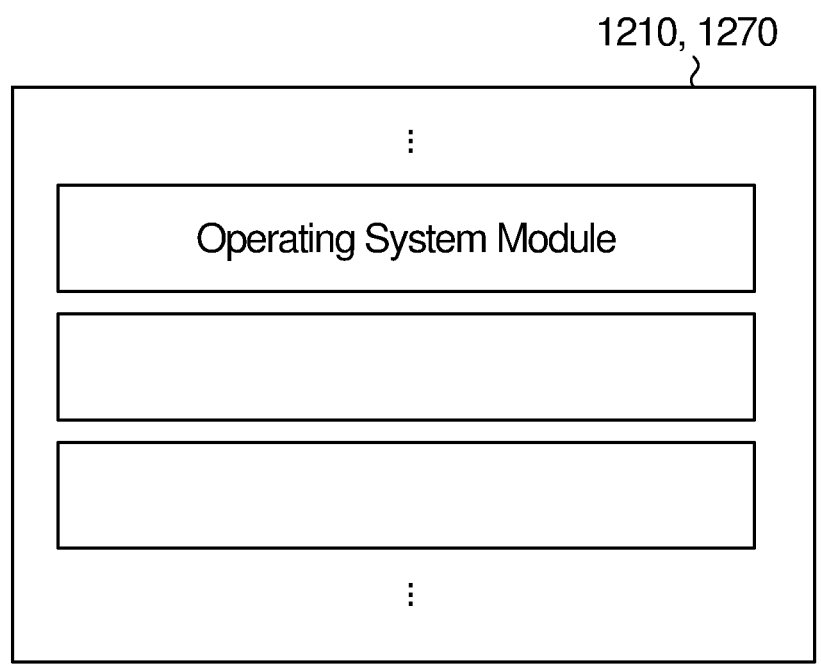
FIG. 14 is a block diagram of component modules.

It should be appreciated that one or more steps of the embodiment methods provided herein may be performed by corresponding units or modules, according to FIG. 14. For example, a signal may be transmitted by a transmitting unit or a transmitting module. A signal may be received by a receiving unit or a receiving module. A signal may be processed by a processing unit or a processing module. Other steps may be performed by an ML module. The respective units/modules may be implemented using hardware, one or more components or devices that execute software, or a combination thereof. For instance, one or more of the units/modules may be an integrated circuit, such as field programmable gate arrays (FPGAs) or application-specific integrated circuits (ASICs). It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs such as 1210 and base stations such as 1270 are known to those of skill in the art. As such, these details are omitted here.

In general, apparatus embodiments implementing methods as disclosed herein could take any of various forms. For example, in an embodiment a first UE for a wireless communication network includes a receiver, a transmitter, a processor coupled to the receiver and to the transmitter, and a processor-readable memory coupled to the processor. The processor-readable memory stores processor-executable instructions which, when executed by the processor, cause the processor to perform a method. In some embodiments, the method involves receiving signaling that is associated with a direct wireless communication link between the first UE and a second UE, and transmitting to network equipment in the wireless communication network signaling indicative of an estimate of range between the first UE and the second UE. The estimate of range is based on the received signaling.

Features that are described elsewhere herein are also applicable to UE embodiments. For example, embodiments may include any one or more of the following features, in any of various combinations:

the signaling associated with the direct wireless communication link is or includes SL-PRS signaling;

the transmitted signaling is further indicative of channel data estimated based on the received signaling;

the channel data is or includes a transformed version of raw channel data estimated based on the received signaling;

the processor-executable instructions, when executed by the processor, further cause the processor to receive signaling that is associated with a downlink communication link between the first UE and a network component in the wireless communication network;

the processor-executable instructions, when executed by the processor, further cause the processor to transmit to the network equipment signaling indicative of an estimate of range between the first UE and the network component;

the estimate of range between the first UE and the network component is based on the received signaling that is associated with the downlink communication link;

the transmitted signaling indicative of an estimate of range between the first UE and the network component is further indicative of downlink channel data estimated based on the received signaling that is associated with the downlink communication link;

the downlink channel data is or includes a transformed version of raw channel data estimated based on the received signaling that is associated with the downlink communication link;

the processor-executable instructions, when executed by the processor, further cause the processor to transmit to the network equipment signaling indicative of displacement of the first UE subsequent to transmitting the signaling indicative of an estimate of range;

the processor-executable instructions, when executed by the processor, further cause the processor to receive, from the network equipment, signaling indicative of a prediction model for prediction of LoS status of communication links;

the prediction model is based in part on the estimate of range between the first UE and the second UE;

the processor-executable instructions, when executed by the processor, further cause the processor to receive signaling associated with a communication link;

the processor-executable instructions, when executed by the processor, further cause the processor to transmit signaling indicative of a prediction from the prediction model of LoS status of the communication link.

UE features may also or instead be implemented in the form of a processor-readable memory storing processor-executable instructions which, when executed by a processor in a first UE in a wireless communication network, cause the processor to perform a method. As an example, a method may include receiving signaling that is associated with a direct wireless communication link between the first UE and a second UE, and transmitting to network equipment in the wireless communication network signaling indicative of an estimate of range between the first UE and the second UE. The estimate of range is based on the received signaling.

Other UE features disclosed herein may be implemented in processor-readable memory embodiments. For example, any one or more of the following features and/or others disclosed herein may be provided, in any of various combinations, in some embodiments:

the signaling associated with the direct wireless communication link is or includes SL-PRS signaling;

the processor-executable instructions, when executed by the processor, further cause the processor to receive signaling that is associated with a downlink communication link between the first UE and a network component in the wireless communication network;

the processor-executable instructions, when executed by the processor, further cause the processor to transmit to the network equipment signaling indicative of an estimate of range between the first UE and the network component, the estimate of range between the first UE and the network component being based on the received signaling that is associated with the downlink communication link;

the processor-executable instructions, when executed by the processor, further causing the processor to receive, from the network equipment, signaling indicative of a prediction model for prediction of LoS status of communication links, the prediction model being based in part on the estimate of range between the first UE and the second UE.

At least some features disclosed herein are applicable to network equipment for a wireless communication network. For example, according to an embodiment, network equipment includes a transmitter, a receiver, a processor coupled to the transmitter and to the receiver; and a processor-readable memory, coupled to the processor, and storing processor-executable instructions which, when executed by the processor, cause the processor to perform a method that involves: receiving signaling that is indicative of an estimate of range associated with a direct wireless communication link between a first UE and a second UE in the wireless communication network; and transmitting one or more of: signaling indicative of a prediction model for prediction of LoS status of communication links in the wireless communication network, and signaling indicative of a prediction from the prediction model of LoS status of one or more communication links in the wireless communication network, the prediction model being based in part on the estimate of range between the first UE and the second UE.

Features that are described elsewhere herein are also applicable to network equipment embodiments. For example, embodiments may include any one or more of the following features, in any of various combinations:

the received signaling is further indicative of channel data estimated for the direct wireless communication link;

the processor-executable instructions, when executed by the processor, further cause the processor to receive signaling indicative of an estimate of range associated with a downlink communication link between the first UE and a network component in the wireless communication network;

the prediction model is further based on the estimate of range associated with the downlink communication link;

the processor-executable instructions, when executed by the processor, further cause the processor to receive signaling indicative of displacement of the first UE subsequent to determination by the first UE of the estimate of range;

the processor-executable instructions, when executed by the processor, further cause the processor to receive signaling that is indicative respective estimates of range associated with direct wireless communication links of further UEs in the wireless communication network;

the prediction model is further based on the estimates of range associated with the direct wireless communication links of the further UEs;

the processor-executable instructions, when executed by the processor, further cause the processor to receive signaling that is indicative respective estimates of range associated with network communication links of network components in the wireless communication network;

the prediction model is further based on the estimates of range associated with the network communication links of the network components;

the processor-executable instructions, when executed by the processor, further cause the processor to generate training data for training the prediction model based in part on the estimate of range between the first UE and the second UE;

the processor-executable instructions, when executed by the processor, further cause the processor to receive further signaling indicative of further estimates of range associated with further communication links;

the generating involves exploiting one or more of: spatial diversity, angular diversity, and temporal diversity based on the received signaling and the received further signaling;

the generating involves generating the training data based on closed connectivity paths between three or more elements of the wireless communication network;

the elements of the wireless communication network include the UE, further UEs, and network components in the wireless communication network.

According to another embodiment, instructions stored in a processor-readable memory at network equipment cause a network equipment processor to perform a method that involves: receiving signaling that is indicative of an estimate of range associated with a direct wireless communication link between a first UE and a second UE in the wireless communication network; and transmitting one or more of: signaling indicative of a prediction model for prediction of LoS status of communication links in the wireless communication network, and signaling indicative of a prediction from the prediction model of LoS status of one or more communication links in the wireless communication network, the prediction model being based in part on the estimate of range between the first UE and the second UE.

Other network equipment and/or processor-readable memory embodiments, including features that are disclosed elsewhere herein, are also possible.

In general, the present disclosure contemplates embodiments in which the problem of LoS identification is addressed by (i) generating LoS/NLoS labels based on different geometric discrepancy analyses and (ii) training an NN to generalize to unseen locations. Once training is complete, in some embodiments the trained model is transferred to UEs so that the UEs can infer LoS/NLoS status of at least their SLs, and possibly DLs in implementations without UL/DL channel reciprocity. Such knowledge of LoS/NLoS status is useful for cooperative localization, for example. Cooperative localization or positioning may still take place on the network side, with each UE v sending its SL predictions, and potentially DL predictions, to one or more network components such as a positioning server.

Some disclosed embodiments may be summarized as proposing LoS or NLoS identification techniques that leverage measurements in SL, in conjunction with UL/DL, to create clues or labels in the form of three-state vectors in order to train an NN. Some embodiments for generating clues or labels are capable of exploiting wide knowledge across several BSs, along with measurements of UE acceleration by integrated IMUs. A model trained with such labels, paired with their corresponding channels or tensors for example, may be applied to yield a LoS or NLoS identification module that is capable of predicting NLoS/LoS status of UL/DL/SL at locations that have not been visited before, and therefore were not used for training the NN. Once a prediction model is trained, cooperative positioning is provided in some embodiments, as the position estimation problem for several UEs cannot be disentangled to individual optimization problems for each UE due to the presence of SL communications.

Embodiments may realize significant time savings during training, relative to expert system-based training data collection. Training data is contributed by all active UEs, and online during UE-BS communications in some embodiments. Online training data collection may also improve robustness, in that no separate surveying stage is required for training. LoS identification and positioning determination based only on LoS links as disclosed herein can also enhance positioning accuracy. The disclosed embodiments have no need for ground-truth NLoS biases, and therefore scalability is improved relative to ground-truth-dependent techniques. Embodiments may also be preferable over other techniques in terms of backward compatibility and ease of integration into 5G positioning subsystems, for example.

Moreover, proactive resource management is enabled in some embodiments, based on the knowledge of which links are LoS links and which are not. For example, active localization or positioning determination is the process of estimating the location of a transmitting or receiving device in a communication network. An active device is actively engaged in processing data in some way, hence the name "active".

To potentially increase spectral efficiency and have better control on interference patterns in the environment, cell size in cellular network have evolved to become smaller. With cellular network committed to support coverage for UEs at higher velocities, handover between cells has to be carried out more frequently to maintain uninterrupted UE connectivity. Adaptive power allocation during handoff is also based on a reactive methodology. When received signal power associated with a UE has already dropped below a threshold, a handoff procedure is initiated to search for cells or beams that offer stronger channels. This approach burdens the network with many constraints such as delay requirements. For example, the handoff process may be performed at gateways that are one or more hops away from BSs, and there may be a requirement that highly mobile UEs are to remain unaware of handover-related processes such as detachment and re-attachment. On the other hand, if the network knows the locations of UEs, a proactive decision can be made to start handoff procedures in advance instead of waiting until received signal power has already dropped below a threshold.

Numerous modifications and variations of the present disclosure are possible in light of the above teachings. It is therefore to be understood that within the scope of the appended claims, the disclosure may be practiced otherwise than as specifically described herein.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

Although this disclosure refers to illustrative embodiments, the disclosure is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

ML is an emerging and fast-growing field, as a result of advances in computer architecture such as General Purpose Graphics Processing Units (GP-GPUs). As an example, deep CNNs have attracted attention because of their ability to find patterns in data with intrinsic structure through the use of convolutional filters. The application of ML to the field of communications is largely unexplored and may help outperform existing solutions and/or help reshape wireless networks conceptually. ML modules as referenced herein are intended to be components or blocks based on an implementation of ML mechanisms. One example of an ML implementation is a neural network implemented in hardware, one or more components that execute software, or a combination thereof.

It should be appreciated that although ML is used in some embodiments and may be quite useful and efficient in predicting LoS/NLoS status of links, for example, ML represents only one possible type of implementation. Non-ML embodiments are also possible.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as processor-executable or computer-executable instructions stored on a non-transitory processor-readable or computer-readable medium, for example. Such media could store programming or instructions to perform any of various methods consistent with the present disclosure.

Moreover, any module, component, or device exemplified herein that executes instructions may include or otherwise have access to a non-transitory computer-/processor-readable storage medium or media for storage of information, such as computer-/processor-readable instructions, data structures, program modules, and/or other data. A non-exhaustive list of examples of non-transitory computer-/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer-/processor-readable storage media may be part of a device or accessible or connectable thereto. Any application or module herein described may be implemented using computer-/processor-readable/executable instructions that may be stored or otherwise held by such non-transitory computer-/processor-readable storage media.

The invention claimed is:

1. A method in a wireless communication network, the method comprising:
receiving, by a first user equipment (UE), signaling that is associated with a direct wireless communication link between the first UE and a second UE;
transmitting, by the first UE, to network equipment in the wireless communication network signaling indicative of an estimate of range between the first UE and the second UE, the estimate of range being based on the received signaling; and
receiving, by the first UE, from the network equipment, signaling indicative of a prediction model for prediction of line of sight (LoS) status of communication links, the prediction model being based in part on the estimate of range between the first UE and the second UE.

2. The method of claim 1, wherein the signaling associated with the direct wireless communication link comprises sidelink positioning reference signal (SL-PRS) signaling.

3. The method of claim 1, wherein the transmitted signaling is further indicative of channel data estimated based on the received signaling.

4. The method of claim 1, further comprising:
receiving, by the first UE, signaling that is associated with a downlink communication link between the first UE and a network component in the wireless communication network; and
transmitting, by the first UE, to the network equipment signaling indicative of an estimate of range between the first UE and the network component, the estimate of range between the first UE and the network component being based on the received signaling that is associated with the downlink communication link.

5. The method of claim 4, wherein the transmitted signaling indicative of the estimate of range between the first UE and the network component is further indicative of downlink channel data estimated based on the received signaling that is associated with the downlink communication link.

6. The method of claim 1, further comprising:
transmitting, by the first UE, to the network equipment signaling indicative of displacement of the first UE subsequent to transmitting the signaling indicative of the estimate of range between the first UE and the second UE.

7. The method of claim 1, further comprising:
receiving, by the first UE, signaling associated with a communication link; and
transmitting, by the first UE, signaling indicative of a prediction from the prediction model of LoS status of the communication link.

8. A first user equipment (UE) for a wireless communication network, the first UE comprising:
a receiver;
a transmitter;
a processor coupled to the receiver and to the transmitter; and
a processor-readable memory, coupled to the processor, and storing processor-executable instructions which, when executed by the processor, cause the processor to perform a method comprising:
receiving signaling that is associated with a direct wireless communication link between the first UE and a second UE; and
transmitting to network equipment in the wireless communication network signaling indicative of an estimate of range between the first UE and the second UE, the estimate of range being based on the received signaling,
the processor-executable instructions, when executed by the processor, further causing the processor to:
receive, from the network equipment, signaling indicative of a prediction model for prediction of line of sight (LoS) status of communication links, the prediction model being based in part on the estimate of range between the first UE and the second UE.

9. The first UE of claim 8, wherein the signaling associated with the direct wireless communication link comprises sidelink positioning reference signal (SL-PRS) signaling.

10. The first UE of claim 8, wherein the transmitted signaling is further indicative of channel data estimated based on the received signaling.

11. The first UE of claim 8, the processor-executable instructions, when executed by the processor, further causing the processor to:
- receive signaling that is associated with a downlink communication link between the first UE and a network component in the wireless communication network; and
- transmit to the network equipment signaling indicative of an estimate of range between the first UE and the network component, the estimate of range between the first UE and the network component being based on the received signaling that is associated with the downlink communication link.

12. The first UE of claim 11, wherein the transmitted signaling indicative of an estimate of range between the UE and the network component is further indicative of downlink channel data estimated based on the received signaling that is associated with the downlink communication link.

13. The first UE of claim 8, the processor-executable instructions, when executed by the processor, further causing the processor to:
- transmit to the network equipment signaling indicative of displacement of the first UE subsequent to transmitting the signaling indicative of the estimate of range between the first UE and the second UE.

14. The first UE of claim 8, the processor-executable instructions, when executed by the processor, further causing the processor to:
- receive signaling associated with a communication link; and
- transmit signaling indicative of a prediction from the prediction model of LoS status of the communication link.

15. A processor-readable memory storing processor-executable instructions which, when executed by a processor in a first user equipment (UE) in a wireless communication network, cause the processor to perform a method comprising:
- receiving signaling that is associated with a direct wireless communication link between the first UE and a second UE;
- transmitting to network equipment in the wireless communication network signaling indicative of an estimate of range between the first UE and the second UE, the estimate of range being based on the received signaling, the processor-executable instructions, further causing the processor to:
- receive, from the network equipment, signaling indicative of a prediction model for prediction of line of sight (LoS) status of communication links, the prediction model being based in part on the estimate of range between the first UE and the second UE.

16. The processor-readable memory of claim 15, wherein the signaling associated with the direct wireless communication link comprises sidelink positioning reference signal (SL-PRS) signaling.

17. The processor-readable memory of claim 15, the processor-executable instructions, when executed by the processor, further causing the processor to:
- receive signaling that is associated with a downlink communication link between the first UE and a network component in the wireless communication network; and
- transmit to the network equipment signaling indicative of an estimate of range between the first UE and the network component, the estimate of range between the first UE and the network component being based on the received signaling that is associated with the downlink communication link.

\* \* \* \* \*